United States Patent
Ozawa et al.

(10) Patent No.: US 7,755,316 B2
(45) Date of Patent: Jul. 13, 2010

(54) MOVING MEMBER MOVEMENT CONTROL APPARATUS, MOVING MEMBER MOVEMENT CONTROL METHOD AND MACHINE TOOL MOVEMENT CONTROL APPARATUS

(75) Inventors: Satoru Ozawa, Shizuoka (JP); Noriyuki Yazaki, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 305 days.

(21) Appl. No.: 11/824,519

(22) Filed: Jun. 29, 2007

(65) Prior Publication Data
US 2008/0012519 A1 Jan. 17, 2008

(30) Foreign Application Priority Data
Jun. 30, 2006 (JP) ............................ 2006-181175
Oct. 31, 2006 (JP) ............................ 2006-295557

(51) Int. Cl.
*G05B 19/33* (2006.01)
(52) U.S. Cl. ...................... 318/575; 318/567; 318/560
(58) Field of Classification Search ................ 318/575, 318/567, 560
See application file for complete search history.

(56) References Cited

U.S. PATENT DOCUMENTS

| | | | | |
|---|---|---|---|---|
| 4,565,950 A | * | 1/1986 | Kikuno | 318/85 |
| 4,600,985 A | * | 7/1986 | Nozawa et al. | 700/188 |
| 4,835,710 A | * | 5/1989 | Schnelle et al. | 700/262 |
| 5,590,034 A | * | 12/1996 | Snell | 700/61 |
| 5,751,130 A | * | 5/1998 | Hara et al. | 318/575 |
| 6,226,565 B1 | * | 5/2001 | Elfving et al. | 700/254 |
| 6,557,388 B1 | * | 5/2003 | Mitsumaru et al. | 72/253.1 |
| 7,062,334 B2 | * | 6/2006 | Tanaka et al. | 700/69 |
| 7,102,315 B2 | * | 9/2006 | Nakata et al. | 318/568.22 |

FOREIGN PATENT DOCUMENTS

| | | |
|---|---|---|
| EP | 1 755 010 A1 | 2/2007 |
| JP | 9-262742 | 10/1997 |
| JP | 11-104934 | 4/1999 |

(Continued)

OTHER PUBLICATIONS

Extended European Search Report for European Application No. 07111424.3-2302, mailed on Oct. 23, 2007 (7 pages).

(Continued)

*Primary Examiner*—Bentsu Ro
*Assistant Examiner*—David S Luo
(74) *Attorney, Agent, or Firm*—Osha • Liang LLP

(57) ABSTRACT

A movement control apparatus for a moving member, includes: a drive unit that moves a moving member by rapid traverse on a first axis and a second axis intersecting the first axis, and overlaps the rapid traverse movements in the two axis directions to thereby allow the moving member to move around the periphery of a given area; a reference arc setting unit that sets a reference arc inscribed in the first and second axes; a timing setting unit that sets an overlap movement start timing for the rapid traverse of the moving member based on the reference arc when switching the moving member from the first axis to the second axis; and a control unit that controls the operation of the drive unit to move the moving member at a timing set by the timing setting unit.

8 Claims, 19 Drawing Sheets

FOREIGN PATENT DOCUMENTS

JP            2006-24174        1/2006

OTHER PUBLICATIONS

Patent Abstracts of Japan for Japanese Publication No. 09-262742, Publication date Oct. 7, 1997 (1 page).

Patent Abstracts of Japan for Japanese Publication No. 11-104934, Publication date Apr. 20, 1999 (1 page).

Patent Abstracts of Japan for Japanese Publication No. 2006-024174, Publication date Jan. 26, 2006 (1 page).

* cited by examiner

FIG. 12

| X AXIS TRAVEL DISTANCE | REFERENCE ARC RADIUS |   |   |   |   |   |   |   |   |   |   |   |   |   |   |
|---|---|---|---|---|---|---|---|---|---|---|---|---|---|---|---|
|  | 1 | 2 | 3 | 4 | 5 | 6 | 7 | 8 | 9 | 10 | 11 | ... | ... | ... | ... |
| 1 | *** | *** | *** | *** | *** | *** | *** | *** | *** | *** | *** | *** | *** | *** | *** |
| 2 | *** | *** | *** | *** | *** | *** | *** | *** | *** | *** | *** | *** | *** | *** | *** |
| 3 |  | *** | *** | *** | *** | *** | *** | *** | *** | *** | *** | *** | *** | *** | *** |
| 4 |  |  | *** | *** | *** | *** | *** | *** | *** | *** | *** | *** | *** | *** | *** |
| 5 |  |  |  | *** | *** | *** | *** | *** | *** | *** | *** | *** | *** | *** | *** |
| 6 |  |  |  |  | *** | *** | *** | *** | *** | *** | *** | *** | *** | *** | *** |
| 7 |  |  |  |  | *** | *** | *** | *** | *** | *** | *** | *** | *** | *** | *** |
| 8 |  |  |  |  |  | *** | *** | *** | *** | *** | *** | *** | *** | *** | *** |
| 9 |  |  |  |  |  | *** | *** | *** | *** | *** | *** | *** | *** | *** | *** |
| 10 |  |  |  |  |  | 4.1 | *** | *** | *** | *** | *** | *** | *** | *** | *** |
| 11 |  |  |  |  |  |  | *** | *** | *** | *** | *** | *** | *** | *** | *** |
| 12 |  |  |  |  |  |  | *** | *** | *** | *** | *** | *** | *** | *** | *** |
| 13 |  |  |  |  |  |  |  | *** | *** | *** | *** | *** | *** | *** | *** |
| 14 |  |  |  |  |  |  |  |  | *** | *** | *** | *** | *** | *** | *** |
| 15 |  |  |  |  |  |  |  |  | *** | *** | *** | *** | *** | *** | *** |
| 16 |  |  |  |  |  |  |  |  |  | *** | *** | *** | *** | *** | *** |
| 17 |  |  |  |  |  |  |  |  |  |  | *** | *** | *** | *** | *** |
| 18 |  |  |  |  |  |  |  |  |  |  | *** | *** | *** | *** | *** |
| 19 |  |  |  |  |  |  |  |  |  |  |  | *** | *** | *** | *** |
| ... |  |  |  |  |  |  |  |  |  |  |  | *** | *** | *** | *** |
| ... |  |  |  |  |  |  |  |  |  |  |  |  | *** | *** | *** |
| ... |  |  |  |  |  |  |  |  |  |  |  |  |  | *** | *** |
| ... |  |  |  |  |  |  |  |  |  |  |  |  |  |  | *** |

FIG. 13

| Y AXIS TRAVEL DISTANCE | REFERENCE ARC RADIUS | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | ... | ... | ... |
| 1 | *** | | | | | | | | | | | | | |
| 2 | *** | *** | | | | | | | | | | | | |
| 3 | *** | *** | *** | | | | | | | | | | | |
| 4 | *** | *** | *** | *** | | | | | | | | | | |
| 5 | *** | *** | *** | *** | *** | | | | | | | | | |
| 6 | *** | *** | *** | *** | *** | *** | | | | | | | | |
| 7 | *** | *** | *** | *** | *** | *** | *** | | | | | | | |
| 8 | *** | *** | *** | *** | *** | *** | *** | *** | | | | | | |
| 9 | *** | *** | *** | *** | *** | *** | *** | *** | *** | | | | | |
| 10 | *** | *** | *** | *** | *** | *** | *** | *** | *** | *** | | | | |
| ... | *** | *** | *** | *** | *** | *** | *** | *** | *** | *** | *** | | | |
| ... | *** | *** | *** | *** | *** | *** | *** | *** | *** | *** | *** | | | |
| ... | *** | *** | *** | *** | *** | *** | *** | *** | *** | *** | *** | *** | | |
| ... | *** | *** | *** | *** | *** | *** | *** | *** | *** | *** | *** | *** | | |
| ... | *** | *** | *** | *** | *** | *** | *** | *** | *** | *** | *** | *** | *** | |
| 34 | *** | *** | *** | *** | *** | *** | *** | *** | *** | *** | *** | *** | *** | |
| 35 | *** | *** | *** | *** | *** | *** | *** | *** | *** | *** | *** | *** | *** | *** |
| 36 | *** | *** | *** | *** | *** | *** | *** | *** | *** | *** | *** | *** | *** | *** |
| 37 | *** | *** | *** | *** | *** | *** | *** | *** | *** | *** | *** | *** | *** | *** |
| 38 | *** | *** | *** | *** | *** | *** | *** | *** | *** | *** | *** | *** | *** | *** |
| 39 | *** | *** | *** | *** | *** | *** | *** | *** | *** | *** | *** | *** | *** | *** |
| 40 | *** | *** | *** | *** | *** | 34.1 | *** | *** | *** | *** | *** | *** | *** | *** |
| 41 | *** | *** | *** | *** | *** | *** | *** | *** | *** | *** | *** | *** | *** | *** |
| ... | *** | *** | *** | *** | *** | *** | *** | *** | *** | *** | *** | *** | *** | *** |
| ... | *** | *** | *** | *** | *** | *** | *** | *** | *** | *** | *** | *** | *** | *** |
| ... | *** | *** | *** | *** | *** | *** | *** | *** | *** | *** | *** | *** | *** | *** |

FIG. 15

| X AXIS TRAVEL DISTANCE \ REFERENCE ARC RADIUS | 1 | 2 | 3 | 4 | 5 | 6 | 7 | 8 | 9 | 10 | 11 | ... | ... | ... | ... | ... | ... |
|---|---|---|---|---|---|---|---|---|---|---|---|---|---|---|---|---|---|
| 1 | *** | | | | | | | | | | | | | | | | |
| 2 | *** | *** | | | | | | | | | | | | | | | |
| 3 | *** | *** | *** | | | | | | | | | | | | | | |
| 4 | *** | *** | *** | *** | | | | | | | | | | | | | |
| 5 | *** | *** | *** | *** | *** | | | | | | | | | | | | |
| 6 | *** | *** | *** | *** | *** | *** | | | | | | | | | | | |
| 7 | *** | *** | *** | *** | *** | *** | *** | | | | | | | | | | |
| 8 | *** | *** | *** | *** | *** | *** | *** | *** | | | | | | | | | |
| 9 | *** | *** | *** | *** | *** | *** | *** | *** | *** | | | | | | | | |
| 10 | *** | *** | *** | *** | *** | 3.8 | *** | *** | *** | *** | | | | | | | |
| 11 | *** | *** | *** | *** | *** | *** | *** | *** | *** | *** | *** | | | | | | |
| 12 | *** | *** | *** | *** | *** | *** | *** | *** | *** | *** | *** | *** | | | | | |
| 13 | *** | *** | *** | *** | *** | *** | *** | *** | *** | *** | *** | *** | *** | | | | |
| 14 | *** | *** | *** | *** | *** | *** | *** | *** | *** | *** | *** | *** | *** | *** | | | |
| 15 | *** | *** | *** | *** | *** | *** | *** | *** | *** | *** | *** | *** | *** | *** | *** | | |
| 16 | *** | *** | *** | *** | *** | *** | *** | *** | *** | *** | *** | *** | *** | *** | *** | *** | |
| 17 | *** | *** | *** | *** | *** | *** | *** | *** | *** | *** | *** | *** | *** | *** | *** | *** | *** |
| 18 | *** | *** | *** | *** | *** | *** | *** | *** | *** | *** | *** | *** | *** | *** | *** | *** | *** |
| 19 | *** | *** | *** | *** | *** | *** | *** | *** | *** | *** | *** | *** | *** | *** | *** | *** | *** |
| ... | *** | *** | *** | *** | *** | *** | *** | *** | *** | *** | *** | *** | *** | *** | *** | *** | *** |

FIG. 16

| Y AXIS TRAVEL DISTANCE \ REFERENCE ARC RADIUS | 1 | 2 | 3 | 4 | 5 | 6 | 7 | 8 | 9 | 10 | 11 | ... | ... | ... | ... |
|---|---|---|---|---|---|---|---|---|---|---|---|---|---|---|---|
| 1 | *** | | | | | | | | | | | | | | |
| 2 | *** | *** | | | | | | | | | | | | | |
| 3 | *** | *** | *** | | | | | | | | | | | | |
| 4 | *** | *** | *** | *** | | | | | | | | | | | |
| 5 | *** | *** | *** | *** | *** | | | | | | | | | | |
| 6 | *** | *** | *** | *** | *** | *** | | | | | | | | | |
| 7 | *** | *** | *** | *** | *** | *** | *** | | | | | | | | |
| 8 | *** | *** | *** | *** | *** | *** | *** | *** | | | | | | | |
| 9 | *** | *** | *** | *** | *** | *** | *** | *** | *** | | | | | | |
| 10 | *** | *** | *** | *** | *** | *** | *** | *** | *** | *** | | | | | |
| ... | *** | *** | *** | *** | *** | *** | *** | *** | *** | *** | *** | | | | |
| ... | *** | *** | *** | *** | *** | *** | *** | *** | *** | *** | *** | | | | |
| ... | *** | *** | *** | *** | *** | *** | *** | *** | *** | *** | *** | | | | |
| ... | *** | *** | *** | *** | *** | *** | *** | *** | *** | *** | *** | | | | |
| ... | *** | *** | *** | *** | *** | *** | *** | *** | *** | *** | *** | | | | |
| 34 | *** | *** | *** | *** | *** | *** | *** | *** | *** | *** | *** | | | | |
| 35 | *** | *** | *** | *** | *** | *** | *** | *** | *** | *** | *** | | | | |
| 36 | *** | *** | *** | *** | *** | *** | *** | *** | *** | *** | *** | | | | |
| 37 | *** | *** | *** | *** | *** | *** | *** | *** | *** | *** | *** | | | | |
| 38 | *** | *** | *** | *** | *** | *** | *** | *** | *** | *** | *** | | | | |
| 39 | *** | *** | *** | *** | *** | *** | *** | *** | *** | *** | *** | | | | |
| 40 | *** | *** | *** | *** | *** | 29.6 | *** | *** | *** | *** | *** | | | | |
| 41 | *** | *** | *** | *** | *** | *** | *** | *** | *** | *** | *** | | | | |
| ... | *** | *** | *** | *** | *** | *** | *** | *** | *** | *** | *** | | | | |
| ... | *** | *** | *** | *** | *** | *** | *** | *** | *** | *** | *** | | | | |

MOVING MEMBER MOVEMENT CONTROL APPARATUS, MOVING MEMBER MOVEMENT CONTROL METHOD AND MACHINE TOOL MOVEMENT CONTROL APPARATUS

CROSS REFERENCE TO RELATED APPLICATION

This application claims priority from a Japanese Patent Application No. 2006-181175 filed on Jun. 30, 2006, and a Japanese Patent Application No. 2006-295557 filed on Oct. 31, 2006, the entire subject matter of which is incorporated herein by reference.

TECHNICAL FIELD

The present invention relates, in a machine tool such as a lathe including more than one tools parallel arranged on a tool post functioning as a moving member, to a moving member movement control apparatus for moving the moving member in an overlapping manner by rapid traverse in two axes directions intersecting each other at right angles, a moving member movement control method, and a machine tool movement control apparatus.

BACKGROUND

Conventionally, in the above-mentioned machine tool such as a lathe, when switching tools used in machining, for example, there is employed such a tool switching method as shown in FIGS. 17A to 17D and 18. That is, in this machine tool, a tool post 61, on which there are parallel arranged tools 62A, 62B and 62C respectively composed of cutting tools or the like, can be moved correspondingly to a work W not only along the X axis direction which is the advancing and retreating direction of the tools 62A to 62C but also along the Y axis direction which is the parallel arranged direction of the tools 62A to 62C. And, for example, after end of machining of the work W using the tool 62A, when switching the tool 62A over to the tool 62C while skipping the tool 62B with its tool nose projecting, firstly, as shown in FIG. 17A, the tool post 61 is positioned at a first position P1 where the nose of the tool 62A has a given clearance C with respect to the outer peripheral surface of the work W.

After then, as shown in FIG. 17B, the tool post 61 is moved in the X axis direction and is positioned at a second position P2 where the nose of the tool 62B to be skipped has the given clearance C with respect to the outer peripheral surface of the work W. This second position P2 is a transit position where, when the tool post 61 is moved in the Y axis direction, interference between the most projecting tool 62B and work W can be avoided. Next, as shown in FIG. 17C, the tool post 61 is moved in the Y axis direction while skipping the tool 62B and is positioned at a third position P3 where the nose of the tool 62C exists on an X-axis direction extended line passing through the center of the work W. Further, as shown in FIG. 17D, the tool post 61 is moved forward in the X axis direction and is positioned at a fourth position P4 where the nose of the tool 62C has the given clearance C with respect to the outer peripheral surface of the work W.

However, in the conventional movement control method, there is found a problem that, since the tool post 61, at the second position P2 and third position P3, is switched in the moving direction while it is stopped between the X and Y axis directions, the moving time of the tool post 61 in the tool switching operation is long. That is, as shown in FIGS. 18 and 19, where the moving time between the first position P1 and second position P2 is expressed as t1, the moving time between the second position P2 and third position P3 is expressed as t2, and the moving time between the third position P3 and fourth position P4 is expressed as t3, the moving time t0 necessary for the tool replacement is at least t1+t2+t3.

On the other hand, in JP-A-9-262742, there is disclosed a tool movement control method in which, a tool is moved overlappingly in two axes directions in a given time zone to thereby shorten the tool moving time. Also, in JP-A-11-104934, there is disclosed a tool movement control method in which when replacing a tool, while the tool is being moved from the current position to a tool replacement position, there is set an approach position for allowing the tool to pass while avoiding interference with other parts and, at the approach position, the tool is moved overlappingly without stopping the rapid traverse movements in two directions, thereby shortening the tool moving time. Further, in JP-A-2006-24174, there is disclosed a moving member movement control method in which a moving member is moved at a rapid traverse speed by a first axis drive device up to a direction switching point for avoiding interference with other parts, and the moving member is slowly moved at an accelerating or decelerating speed equal to or lower than the maximum accelerating or decelerating speed of the first axis drive device within the moving time of the second axis drive device after the moving member arrives at the direction switching point, thereby shortening the moving time of the moving member.

SUMMARY

However, in these conventional movement control methods, there have been found the following problems.

That is, JP-A-9-262742 discloses a method for moving a tool in the two axes directions at the same time in an overlapping manner but does not disclose a method for moving a tool while setting a moving path capable of preventing the tool from interfering with other parts such as a work. Owing to this, when the method disclosed in JP-A-9-262742 is applied to the tool replacement shown in FIGS. 17A to 17D, there is a fear that, when the tool is selectively moved, the tool can interfere with other parts such as a work.

Also, in the method disclosed in JP-A-11-104934, when the rapid traverse movements in the two directions are actually overlapped with each other, the moving route of the tool is curved in the vicinity of the approach position and the tool is thereby not able to pass through the approach position accurately. In order that the tool can be made to pass through the approach position accurately without interfering with other parts, the rapid traverse movements in the two directions must be stopped once and switched at the approach position, which makes it impossible to shorten the moving time of the tool.

Further, according to the method disclosed in JP-A-2006-24174, the moving member is moved in the two axes directions at the same time. However, since, when the moving member is moved in the outside area of the linear-shaped moving route, it has to make a detour in an expanded manner while drawing an arc-shaped locus, the moving stroke of the moving member increases, which requires a wide moving space.

The present invention is made aiming at solving the above-mentioned problems found in the conventional technologies. Thus, it is an object of the invention is to provide an apparatus for controlling the movement of a moving member, which can move the moving member in a short time along a short moving route capable of preventing the moving member from interfering with other parts, a method for controlling the movement of the moving member, and an apparatus for controlling the movement of a machine tool.

In attaining the above object, according to a first aspect of the invention, there is provided a movement control apparatus for a moving member, including: a drive unit that moves a moving member by rapid traverse on a first axis and a second axis intersecting the first axis, and overlaps the rapid traverse movements in the two axis directions to thereby allow the moving member to move around the periphery of a given area; a reference arc setting unit that sets a reference arc inscribed in the first and second axes; a timing setting unit that sets an overlap movement start timing for the rapid traverse of the moving member based on the reference arc when switching the moving member from the first axis to the second axis; and a control unit that controls the operation of the drive unit to move the moving member at a timing set by the timing setting unit.

According to the present invention, while the moving member is moving along the first axis direction, the moving member is moved in the second axis direction according to a set movement start timing and is rapidly traversed while drawing an approximate arc locus based on the reference arc. Owing to this, the moving member can be moved by rapid traverse in a short time along a moving route capable of preventing the moving member from interfering with other parts. Therefore, when the invention is applied to a machine tool, a moving member such as a tool post provided in the machine tool can be moved and positioned by rapid traverse at a given position in a short time with no interference with a work, thereby being able to enhance the productivity of the machine tool.

By the way, in the present invention, the movement of the moving member includes the movement of the moving member when the moving member moves alone and, in a state where the moving member is fixed, the movement of a second moving member capable of relative movement with respect to the moving member when the second moving member moves alone, or the movements of the these two moving members when they move simultaneously. In short, the movement of the moving member means that the moving member generates a relative movement with respect to other parts. Also, in the invention, the overlap movement means that the moving member is moved in the two directions of the first and second axes simultaneously.

According to a second aspect of the invention according to the first aspect of the invention, the movement control apparatus further includes: a first calculating unit that calculates more than one tangent to the reference arc and the intersections of the respective tangents; and a second calculating unit that calculates a first time and a second time respectively necessary for the moving member to arrive at a first axis direction line parallel to the first axis and at a second axis direction line parallel to the second axis respectively passing through the intersections from the start of the overlap movement, wherein the timing setting unit delays the overlap movement start timing of the moving member in order for the two times to be at least equal to each other when the second time is shorter than the first time.

According to this structure, by setting the overlap movement start timing of the moving member, it can be judged based on the calculation results of the first and second calculating unit whether the moving locus of the moving member passes inside an intersection existing outside the reference arc or not. When the moving locus passes inside the intersection, the moving locus can be corrected to pass outside the intersection by the timing setting unit. When the overlap movement start timing is set in the above-mentioned manner, the overlap movement start timing can be set properly regardless of the rapid traverse speed or the speed of the acceleration or deceleration. Thanks to this, the invention can be flexibly applied even to an apparatus which is different in the rapid traverse speed or in the acceleration or deceleration speed.

According to a third aspect of the invention according to the second aspect of the invention, the more than one tangent are set at regular angle intervals.

Therefore, clearances between the reference arc and the respective intersections can be made equal.

According to a fourth aspect of the invention according to the first aspect of the invention, the timing setting unit includes a table which contains data on overlap movement start timings set based on the relationship between the travel distance of the moving member in the first axis direction and the radius of the reference arc, and the control unit controls the operation of the drive unit according to the data shown in the table.

Thanks to this structure, simply by referring to the table, the overlap movement start timing can be set and thus the setting operation can be carried out quickly.

According to a fifth aspect of the invention according to the fourth aspect of the invention, the table contains data on overlap movement start timings set based on a permissible line and a permissible arc which are continuous with each other and are respectively set by a given amount inwardly of the first axis, second axis and reference arc.

Thanks to this structure, the moving locus of the moving member can be made to approach other parts such as a work without interfering them, thereby being able to shorten the moving time of the moving member. Therefore, when the invention is applied to a machine tool, it can contribute toward enhancing the productively of the machine tool.

According to a sixth aspect of the invention, there is provided a method for controlling a movement of a moving member, including: moving a moving member by rapid traverse on a first axis and a second axis intersecting the first axis, and overlapping the rapid traverse movements of the moving member in the two axes directions to move the moving member around the periphery of a given area; setting a reference arc inscribed in the first and second axes; and setting the overlap movement start timing of the rapid traverse movement of the moving member based on the reference arc when switching the moving member from the first axis to the second axis.

According to the invention, there can be obtained a similar operation to the first aspect of the invention.

According to a seventh aspect of the invention, there is provided a movement control apparatus for a machine tool that includes a tool post with more than one tool parallel arranged thereon, the movement control apparatus including: a drive unit that generates relative movements by rapid traverse between the tool post and a work in the direction of a first axis and in the direction of a second axis intersecting the first axis, and overlaps the rapid traverse relative movements in the two axes directions to thereby move the tool post relatively to the work in the periphery of the work; a reference arc setting unit that sets a reference arc inscribed in the first and second axes; a timing setting unit that sets an overlap movement start timing for the rapid traverse of the tool post based on the reference arc when switching the tool post from the first axis to the second axis; and a control unit that controls the operation of the drive unit to move the tool post at a timing set by the timing setting unit, wherein the switching of the tools is carried out by the control unit. Besides, the movement control apparatus can includes a structure according to any one of the first to fifth aspects of the invention.

Therefore, according to the invention, in the machine tool, there can be obtained a similar operation to the first aspect of the invention.

According to an eighth aspect of the invention according to the seventh aspect of the invention, the movement control apparatus further includes a distance setting unit that sets a spaced distance in the tool parallel arrangement direction between the nose of a tool and the outer peripheral surface of another tool adjoining the tool nose, wherein the reference arc setting unit sets the radius of the reference arc at the value of a distance equal to or less than the spaced distance. According to this structure, it is possible to set a more reasonable arc, which in turn makes it possible to properly prevent interference between a work and a tool such as a cutting tool for machining the side surface of the work.

According to a ninth aspect of the invention according to the seventh aspect of the invention, the movement control apparatus further includes distance setting unit that sets a spaced distance in the tool parallel arrangement direction between the nose of a tool and the outer peripheral surface of another tool adjoining the tool nose, and sets the travel distance of the tool in the tool advancing and retreating direction, wherein the reference arc setting unit compares the spaced distance and travel distance, and the reference arc setting unit sets the radius of the reference arc at the value of the shorter one of the two compared distances. According to this structure, it is possible to set a more reasonable arc, which in turn makes it possible to properly prevent interference between a work W and a tool such as a cutting tool for machining the side surface of the work W.

According to a tenth aspect of the invention according to the seventh aspect of the invention, the movement control apparatus further includes a distance setting unit that sets a spaced distance in the tool parallel arranged direction between a work and the nose of a tool adjoining the work, wherein the reference setting unit sets the radius of the reference arc at the value of a distance equal to or less than the spaced distance. According to this structure, it is possible to properly prevent interference between a work and a front machining tool such as a drill or a reamer.

According to an eleventh aspect of the invention according to the seventh aspect of the invention, the movement control apparatus further includes a distance setting unit that sets a spaced distance in the tool parallel arranged direction between a work and the nose of a tool adjoining the work, and sets the travel distance of the tool in the tool advancing and retreating direction in the tool switching operation, wherein the reference setting unit compares the spaced distance and travel distance, and the reference setting unit sets the radius of the reference arc at the value of the shorter one of the two compared distances. According to this structure, there can be set a more reasonable arc and thus it is possible to properly prevent interference a work and a front machining tool such as a drill or a reamer.

As described above, according to the invention, a moving member can be moved by rapid traverse along a route capable of preventing the moving member from interfering with other parts, thereby being able to enhance the productivity of the machine tool to which the invention is applied.

BRIEF DESCRIPTION OF THE DRAWINGS

In the accompanying drawings:

FIG. 12 is a matrix showing a table used to set an overlap movement start timing at a first corner portion;

FIG. 13 is a matrix showing a table used to set an overlap movement start timing at a second corner portion;

FIG. 15 is a matrix showing a table used to set an overlap movement start timing at a first corner portion according to the third embodiment of the invention;

FIG. 16 is a matrix showing a table used to set an overlap movement start timing at a second corner portion according to the third embodiment of the invention;

DETAILED DESCRIPTION

Now, description will be given below of embodiments of the invention.

First Embodiment

Firstly, description will be given below of a first embodiment of the invention with reference to FIGS. 1 to 10B.

Figure 1:
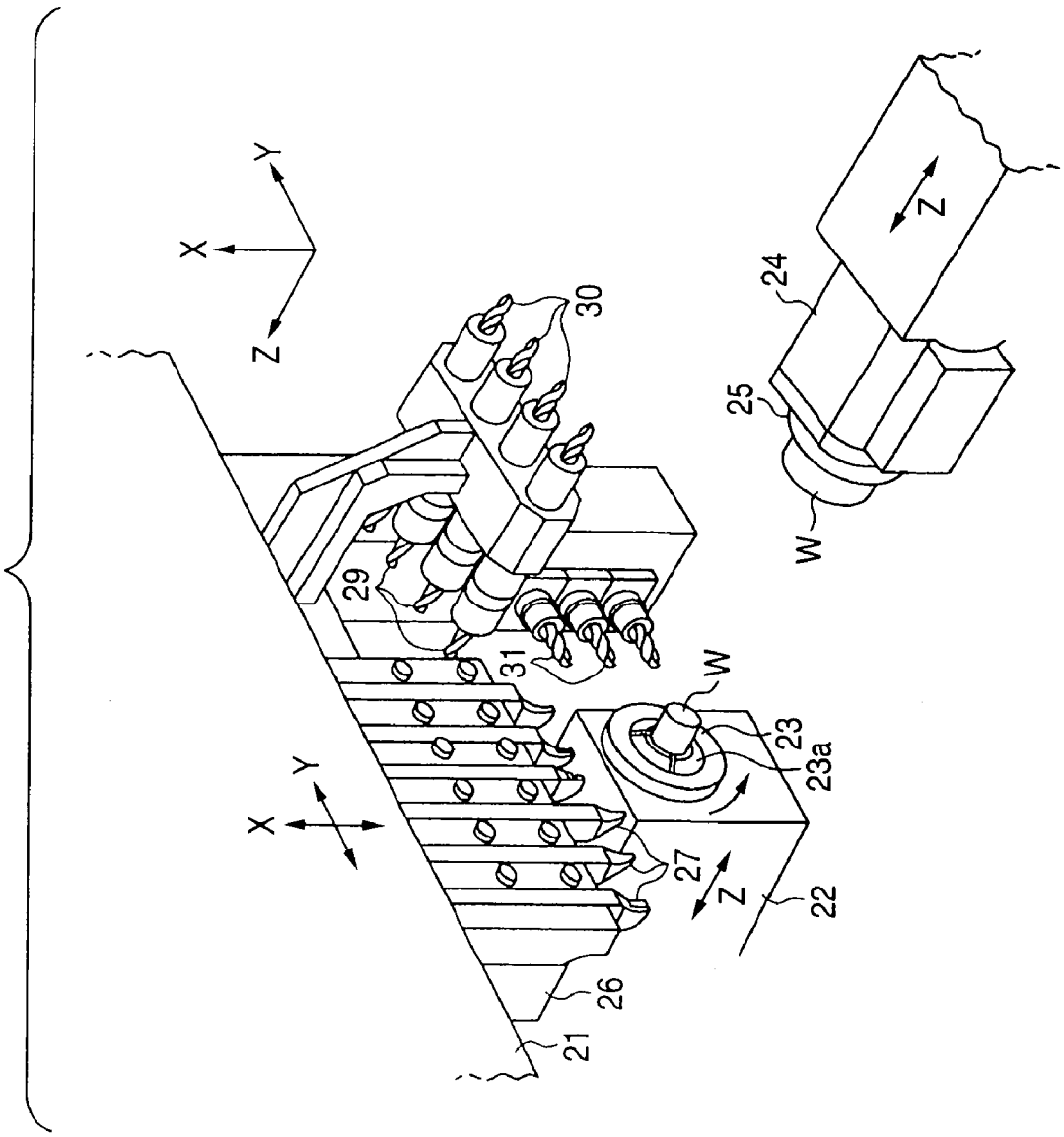
FIG. 1 is a cross-sectional view showing a part of a machine tool including a movement control apparatus according to an aspect of the invention.

As shown in FIG. 1, in a machine tool according to the first embodiment of the invention, a headstock 22 is disposed on a frame 21 in such a manner that it can be moved in the Z axis direction and, on the headstock 22, there is rotatably supported a main spindle 23 which extends in the Z axis direction. On the frame 21, there is disposed a back attachment 24 in such a manner it is situated opposed to the headstock 22 and can be moved in the Z axis direction; and, on the back attachment 24, there is rotatably supported a sub spindle 25 which extends in the Z axis direction. And, on each of the main and sub spindles 23 and 25, there is mounted a collet 23a (a collet on the sub spindle 25 side is not shown) which is capable of holding a work W.

As shown in FIG. 1, between the headstock 22 and back attachment 24, on the machine frame 21, there is disposed a tool post 26 functioning as a moving member in such a manner that it can be moved in the X axis direction and Y axis direction which are respectively perpendicular to the Z axis direction which is the moving direction of the headstock 22. On the tool post 26, there are disposed tools 27 composed of more than one cutting tool extending in the X axis direction and capable of cutting the work W on the main spindle 23 from the outer peripheral side of the work W, while the tools 27 are arranged parallel to each other and are spaced at given intervals in the Y axis direction. Also, on the tool post 26, adjacently to the tools 27, there are further disposed tools 29 to 31 made of drills, reamers or the like extending in the Z axis direction or in the Y axis direction and capable of machining the work W on the main spindle 23 from the end face side thereof or machining the work W on the sub spindle 25 from the end face side thereof, while these tools are arranged parallel to each other and spaced at given intervals in the Y axis direction or in the X axis direction. By the way, not only in the first embodiment but also in the following embodiments, the movements of the headstock 22 and back attachment 24, that is, the movement of the work W and the movement of the tool post 26 may respectively be the relative movements between (the headstock 22 and back attachment 24) and (the work W); and, specifically, the work W or tool post 26 may move alone or both of them may move at the same time. In the respective embodiments, description will be given assuming that the work W or tool post 26 moves alone.

Next, description will be given below of the structures of a control unit 35 for controlling the operation of a machine tool having the above-mentioned structure and other parts thereof.

Figure 2:
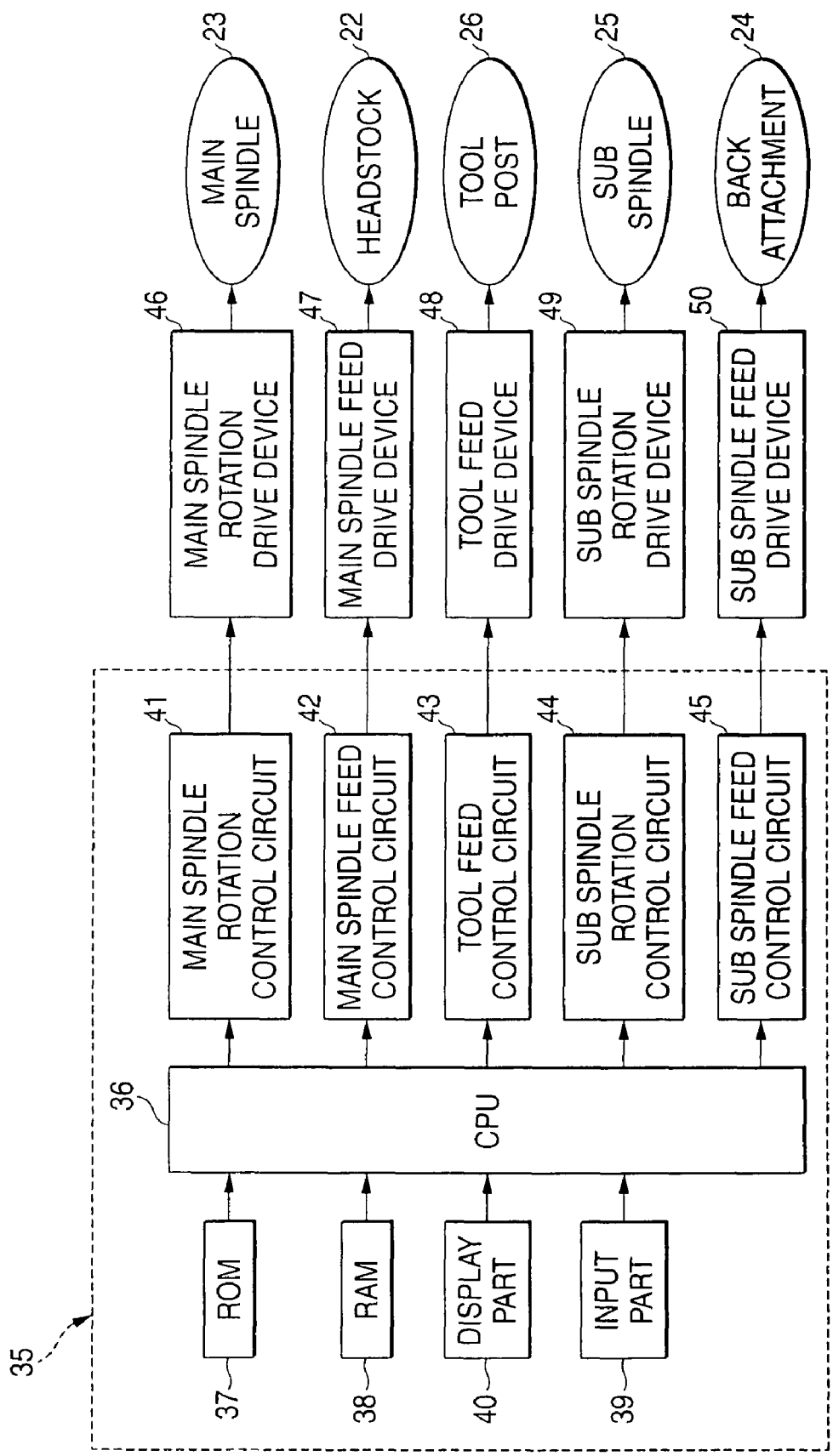
FIG. 2 is a block diagram showing a circuit configuration of the movement control apparatus of FIG. 1.

As shown in FIG. 2, the control unit 35 includes a CPU 36, a ROM 37, a RAM 38, an input part 39, a display part 40, a main spindle rotation control circuit 41, a main spindle feed control circuit 42, a tool feed control circuit 43 constituting a drive part, a sub spindle rotation control circuit 44 and a sub spindle feed control circuit 45. In the present embodiment, the above-mentioned CPU 36, ROM 37 and RAM 38 cooperate together in constituting a reference arc setting unit, a timing setting unit, a first calculating unit, a second calculating unit and a control unit.

The input part 39 is composed of a keyboard including a numeral key or the like; and, from the input part 39, there are manually input various kinds of data and commands relating to the machining operation of the machine tool such as data on the kinds and dimensions of the work W. The display part 40 is composed of a display device such as a liquid crystal display or the like.

The CPU 36 outputs operation instructions to the main spindle rotation control circuit 41, main spindle feed control circuit 42, tool feed control circuit 43, sub spindle rotation control circuit 44 and sub spindle feed control circuit 45 to thereby operate the main spindle 23, headstock 22, tool post 26, sub spindle 25 and back attachment 24 and the like through a main spindle rotation drive device 46 composed of a driving motor or the like, a main spindle feed drive device 47, a tool feed drive device 48, a sub spindle rotation drive device 49 and a sub spindle feed drive device 50.

The tool feed drive device 48, when carrying out the below-mentioned operation to switch the tools 27 on the tool post 26 and tools 27, 30 on the tool post 26 with respect to the work W, moves the tool post 26 in the X axis direction or in the Y axis direction to thereby move the tool post 26 along two axis directions, that is, the advancing and retreating direction of the tools 27 with respect to the work W and the parallel arranged direction of the tools 27. Therefore, the tool feed drive device 48 constitutes a drive unit for driving the tool post 26 in such a manner that the tool post 26 can be moved in the X axis and Y axis directions. Also, when carrying out the switching operation of the other tools 29, 30, the tool feed drive device 48 drives the tool post 26 to move it in the Y axis direction along the parallel arranged direction of the tools 29, 30, while the headstock 22 or back attachment 24 is moved in the Z axis direction which is the axial direction of the work W by the main spindle feed drive device 47 or sub spindle feed drive device 50, whereby the tools 29, 30 are moved relatively along their advancing and retreating direction.

In the ROM 37, there are stored various control programs which are used to machine the work W. And, the CPU 36 controls the progress of the programs stored in the ROM 37. In the RAM 38, there are temporarily stored machining programs, various kinds of data and the like which are manually inputted therein and are calculated by the operation of the CPU 36, and the like. For example, in the Ram 38, there are stored various kinds of data on the tool pitches and the like relating to the respective tools 27, 29 to 31. That is, when the tools are tools 27A to 27C composed of cutting tools shown in FIGS. 5A to 5D, various kinds of data on machining such as tool pitches Pt1, Pt2 between the respective tools 27A to 27C, shank widths L1, L2 of the tools 27A to 27C, distances D1, D3 between the tools 27A to 27C, distances D2, D4 expressing height differences between the noses of the tools 27A to 27C, and the positions of the tool noses are manually input or are operated by the CPU 36, and are then stored into the given area of the RAM 38.

Also, in the other area of the RAM 38, there are stored the maximum speed data and acceleration speed (including deceleration speed) data for every feed speeds such as the rapid traverse, cutting feed and other similar feed of the tool post 26, headstock 22 and back attachment 24 in the respective X, Y and Z axis directions.

Figure 7:
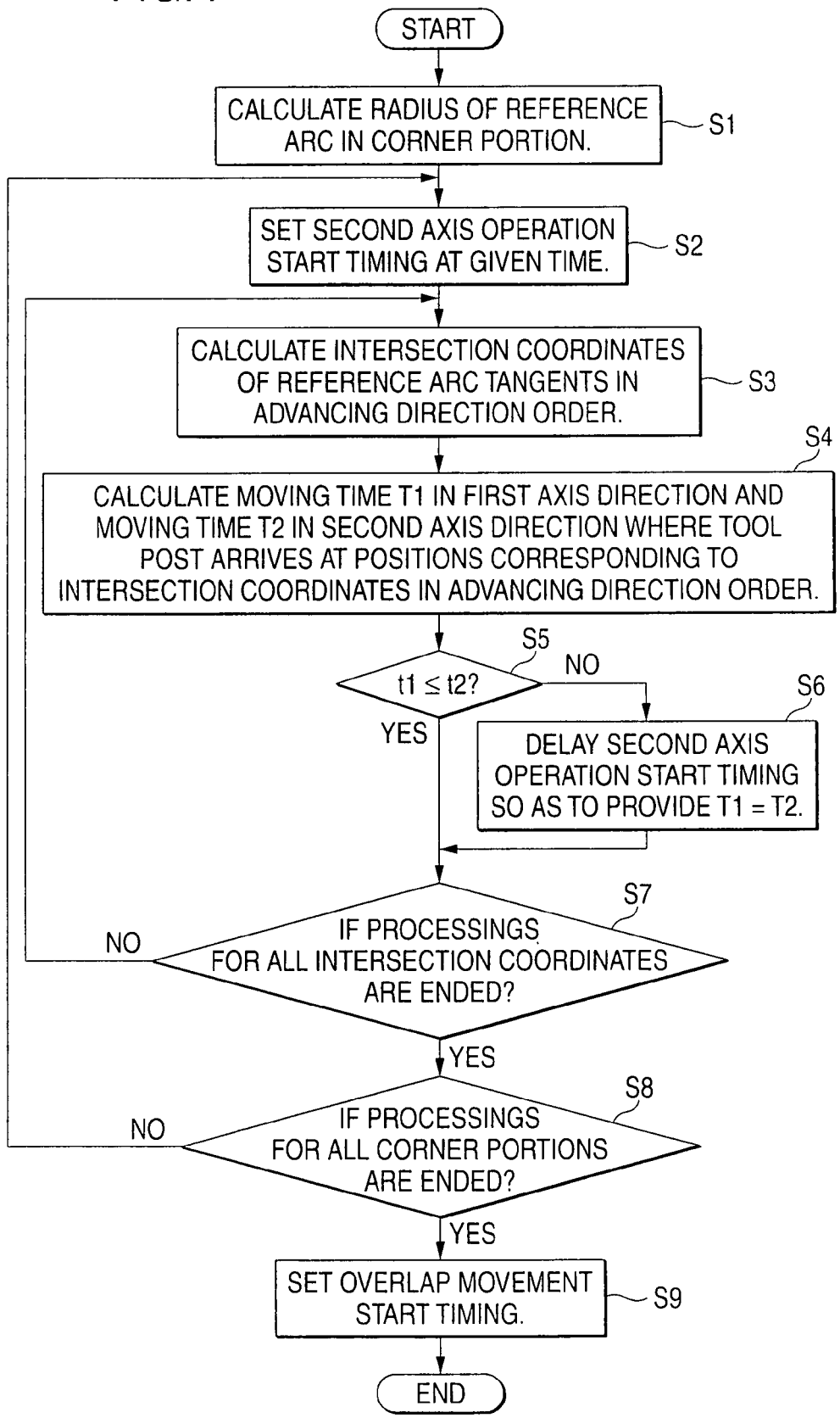
FIG. 7 is a flowchart showing a program for setting an overlap movement start timing according to a first embodiment of the invention.

Further, the RAM 38 includes a temporary retention area for temporarily retaining the operation results of the programs shown in FIG. 7 which will be discussed later, and a working area for retaining the operation results in such a manner that they can be used to control the operation of the tool post 26.

Next, description will be given below of the operation of the above-structured machine tool when the fixed tools 27 composed of cutting tools for machining the work W are switched. This switching operation is carried out by rapid traverse. And, as will be discussed later, for example, as shown in FIGS. 3, 5A to 5D and 8, there is set a reference arc E1 having radiuses D1 to D4 which forms a given area in each of corner portions C1 and C2 in such a manner that it is spaced from the work W and turns round the periphery of the work W. With the movement of the tool post 26, the noses (leading end portions) of the tools 27A to 27C, in one corner portion C1, carry out overlap movements (simultaneously in the X axis and Y axis directions) outside the reference arc E1 according to an overlap movement start timing K set based on the reference arc E1, next move while drawing an arc-shaped locus (which is hereinafter referred to as an approximate arc or an approximate arc locus) E2 shown in FIG. 4, and then move while drawing a linear locus; and further, in the other corner portion C2, these tool noses move outside the reference arc E1 while drawing an approximate arc locus E2 based on the reference arc E1. By the way, in FIGS. 5A to 5D, what moves along the reference arc E1 outside the work W is the nose (leading end portion) of the tool 27B; however, in the following description, the movement of the tool nose (leading end portion) is regarded as the movement of the tool post 26.

Figure 4:
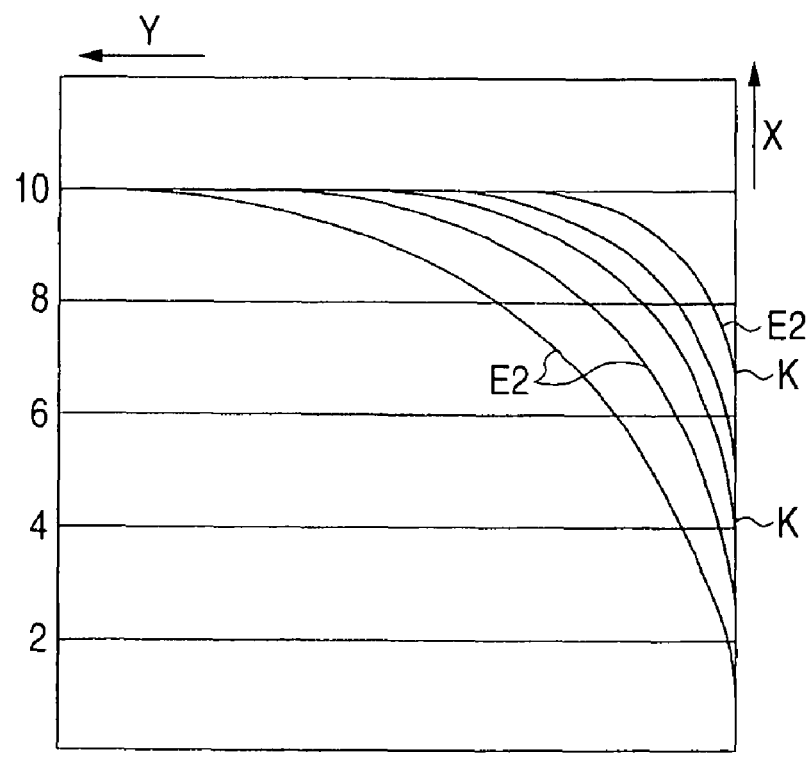
FIG. 4 is a diagram showing a relationship between an overlap movement start timing and an approximate arc locus.

Here, the approximate arc locus E2 of the tool post 26 shown in FIG. 4 is the result obtained by overlapping the rapid traverse movements of the tool post 26 in the X and Y axis directions. That is, the approximate arc movement of the tool post 26 based on the reference arc E1 can be obtained by overlapping the movements of the tool post 26 in the Y axis direction and in the X axis direction, which are different from each other, at a given timing where the tool post 26 is moving in the X axis direction or in the Y axis direction. For example, as shown in FIG. 4, when the movement of the tool post 26 in the X axis direction having started on ahead arrives at a given timing, the movement thereof in the Y axis direction is started, whereby the movements of the tool post 26 in the X and Y axis directions are overlapped with each other to provide the movement that draws the approximate arc locus E2. The reason why the approximate arc locus E2 is formed is as follows: that is, in the movements of the tool post 26 in the X and Y axis directions, when the tool post 26 arrives at the top speed instantaneously and the top speed is maintained, in FIG. 4, the approximate arc locus E2 is not formed but a slanting linear locus is formed. However, actually, in the two end portions of the speed area, there are formed an acceleration area and a deceleration area, respectively; and, therefore, there is formed the approximate arc locus E2. And, as can be seen clearly from FIG. 4, the earlier the overlap movement start timing K is, the longer the overlap time is and the larger the radius of curvature of the approximate arc locus E2 is. On the other hand, the slower the overlap movement start timing K is, the smaller the radius of curvature of the approximate arc locus E2.

Figure 5A:
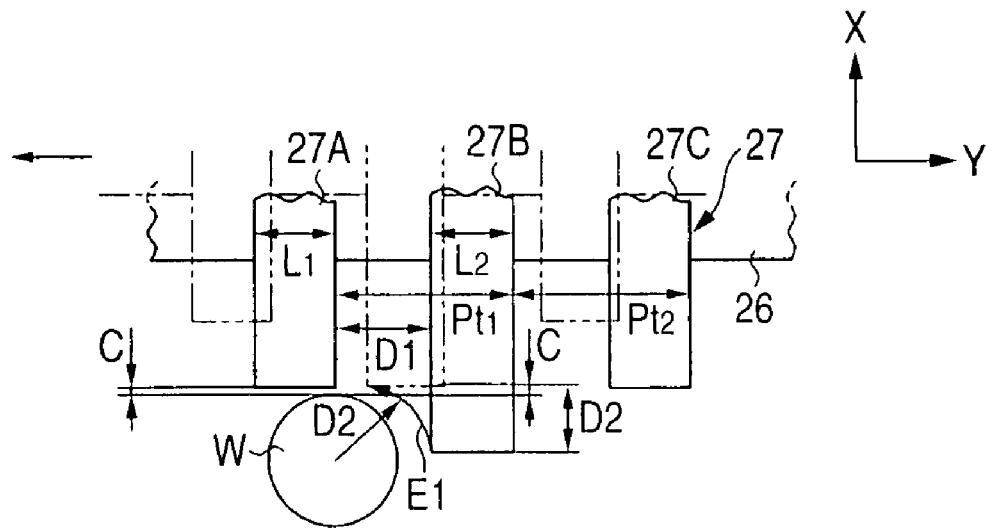
FIGS. 5A to 5D are partial diagrammatic elevation views showing switching operation of tools of the machine tool.
Figure 5B:
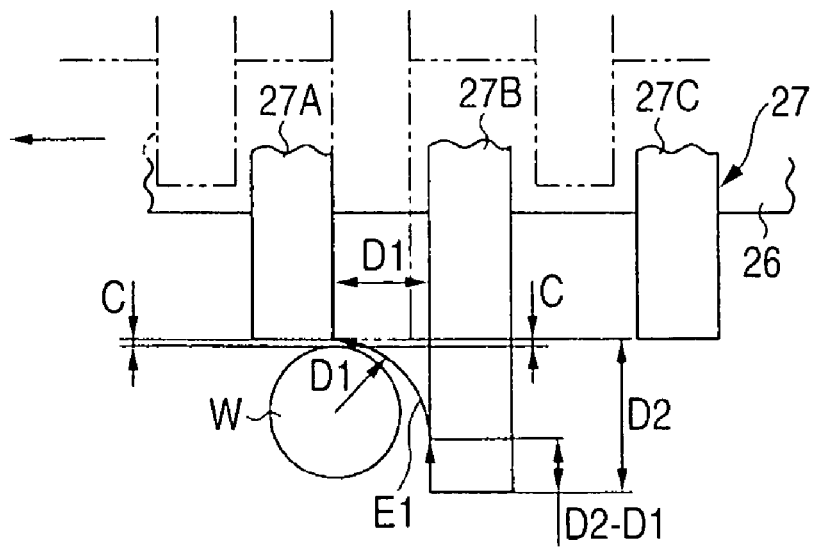

Now, as shown in FIGS. 5A and 5B, when the tools 27A to 27C (in these figures, each tool is shown in a rectangular shape for simplification of illustration) are arranged parallel to each other, for example, in the Y axis direction and they are moved for switching along the Y axis direction, the tool post 26, in order to avoid interference between the most projecting tool 27 (in FIGS. 5A and 5B, tool 27B) and the work W, is retreated in the X axis direction so as to be able to secure a clearance C with the mounting error of the tools 27 or the like taken into consideration. The positions of the tools 27A to 27C and tool post 26 in the X axis direction at the then time are as regarded as their retreat positions, and the retreat positions are regarded as the ends of their moving ranges in the X axis direction. Therefore, the travel distance of the tool post 26 in the X axis direction is determined according to the quantity of projection of the most projecting tool 27B. Also, the travel distance of the tool post 26 in the Y axis direction is determined by the distance between the tools 27 to be switched.

In FIGS. 5A and 5B, by moving the tool post 26 to the left, the tool switching from the left tool 27A to the right tool 27B or 27C is carried out. Here, the spaced distance D1 between the nose of the tool used before switched, that is, the nose of the tool 27A and the outer peripheral surface of the tool adjoining backwardly in the moving direction, that is, the outer peripheral surface of the tool 27B is compared with the retreat distance D2 from the retreat movement start position to the retreat position, thereby setting the reference arc E1 (the reference arc shown right in FIG. 3) having a radius composed of the shorter one of the two compared distances D1 and D2. The spaced distance D1 can be calculated by subtracting the shank width L2 of the tool 27B from the tool pitch Ptl between the tools 27A and 27B. And, the tool post 26 moves outside the reference arc E1 while drawing the approximate arc locus E2 based on the reference arc E1. However, as shown in FIG. 5B, when the radius of the reference arc E1 is D1, since the radius D1 is shorter than the retreat distance D2, firstly, the tool post 26 retreats linearly in the X direction by an amount almost equivalent to the difference between the spaced distance D1 and retreat distance D2 and, after then, the tool post 26 moves following the reference arc E1.

Figure 5C:
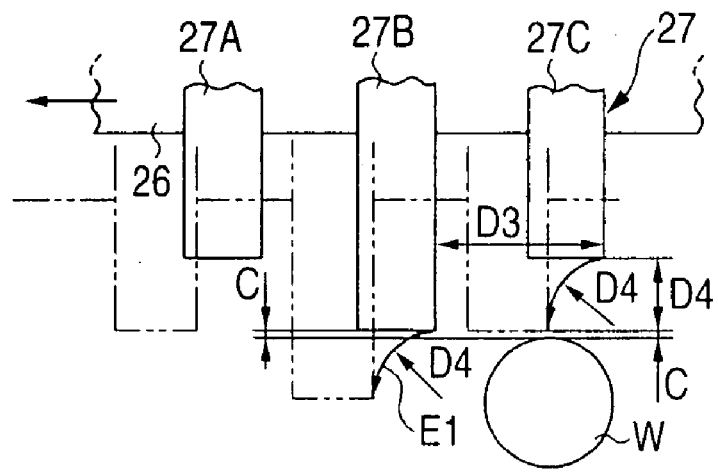
Figure 5D:
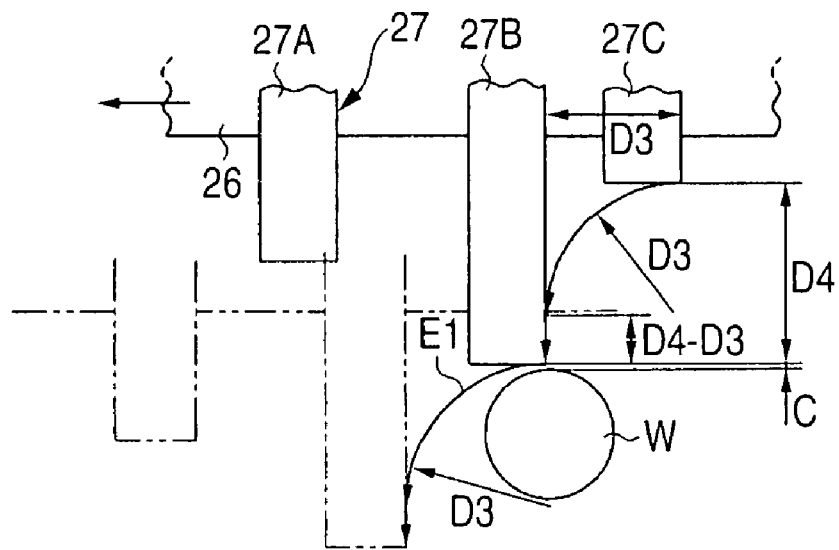

Next, FIGS. 5C and 5D show an operation in which, when a currently used tool 27 is replaced with another other tool 27 to be newly used along the Y axis direction, the tool 27 to be newly used is moved so as to approach the work W from its retreat position.

That is, the tool post 26 has been moved to the retreat position. And, a spaced distance D3 between the outer peripheral surface of a tool adjoining forwardly of the moving direction of the tool to be newly used, that is, the outer peripheral surface of the tool 27B and the nose of the tool to be newly used, that is, the nose of the tool 27C is compared with an approach distance D4 by which the nose of the tool to be newly used is moved so as to approach up to a position where a clearance C can be secured between the nose of the tool and work W, whereby there is set the reference arc E1 having a radius composed of the shorter one of the two compared distances D3 and D4. In the embodiment shown in FIGS. 5A to 5D, the spaced distance D3 is set to be the same as the tool pitch Pt2 and, therefore, the value of the tool pitch Pt2 stored in the RAM 38 can be used as it is. The tool post 26 moves outside the reference arc E1 while drawing an approximate arc locus E2 based on the reference arc E1. However, when the moving radius is D3, the moving radius is smaller than the approach distance D4. Therefore, firstly, the tool post 26 approaches the work W while drawing the approximate arc locus E2 following the reference arc E1; and, after then, the tool post 26 approaches the work W linearly in the X axis direction by an amount almost equivalent to the difference between the approach distance D4 and spaced distance D3.

Here, description will be given below also of a method for calculating the distances D1 to D4 when switching front machining tools.

Figure 6:
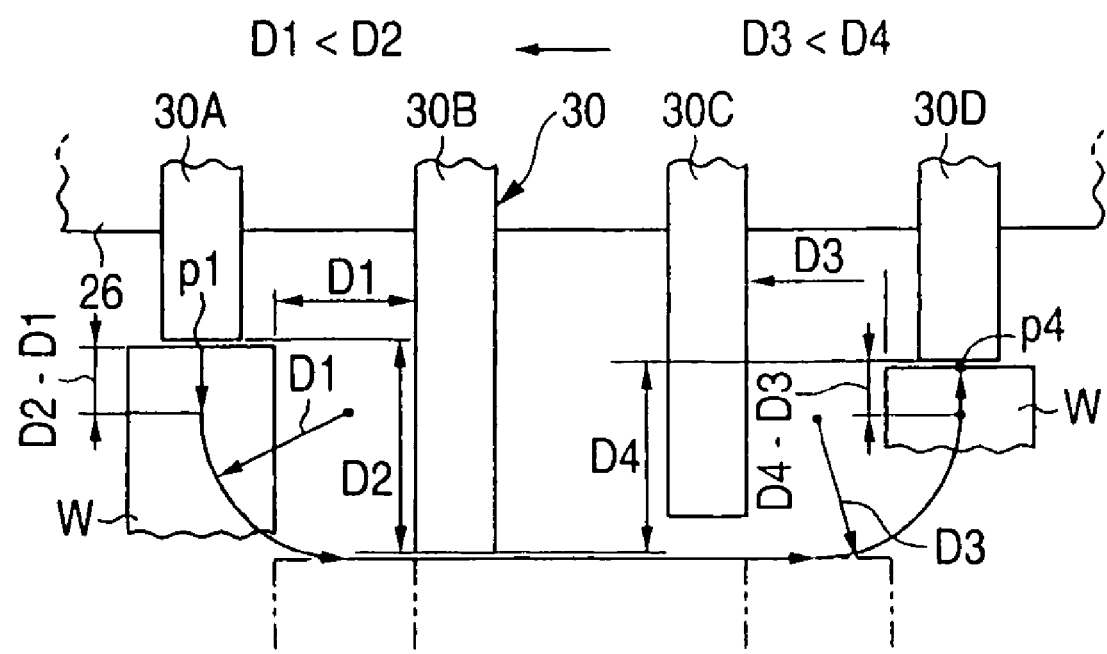
FIG. 6 is a plane view showing switching operation of front machining tools such as a drill and a reamer arranged parallel on the tool post in the machine tool.

FIG. 6 shows an operation to switch tools composed of front machining tools 30A to 30D such as a drill and a reamer arranged parallel on the tool post 26 in the machine tool shown in FIG. 1. The tools 30A to 30D such as a drill and a reamer are structured such that the leading end outer peripheral sides thereof or the whole leading end faces thereof are formed as the tool noses thereof, while the tools 30A to 30D are used to machine the end face of the work W. In FIG. 6, the tools 30, namely, the tools 30A to 30D are different in the projecting quantities thereof and at least one of the centrally situated tools 30B and 30C projects further than the tools 30A and 30D which are situated on the two end sides of the tool post 26. The front machining tools such as a drill and a reamer are different from the tools such as the cutting tools 27 for machining the side surfaces of the work W only in that the spaced distances D1 and D3 (Y axis direction) are changed to the spaced distances D1 and D3 between the outer peripheral surface of the work W and the outer peripheral surfaces of the tools 30A to 30D adjoining the work W.

When the work W is moved from the position of the leftward situated tool 30A to the rightward situated tool 30D for tool switching, as the spaced distance D1 on the tool switch movement start side, there is employed a spaced distance between the outer peripheral surface of the moving direction forward side of the work W, that is, the outer peripheral surface of the work W existing backwardly in the moving direction of the tool post 26 and the outer peripheral surface of the tool 30B. Also, as the spaced distance D3 on the tool switch movement end side, there is employed a spaced distance between the outer peripheral surface of the moving direction backward side of the work W, that is, the outer peripheral surface of the work W existing forwardly in the moving direction of the tool post 26.

As described above, when switching the tools, the spaced distance D1 is compared with the retreat distance D2, and the spaced distance D3 is compared with the approach distance D4 to find the reference arc E1, whereby the tools 30A to 30D can be moved by rapid traverse outside the reference arc E1 with no interference with the work W.

Next, description will be given below of a procedure for switching the tools 27. FIG. 7 shows a routine for setting an overlap movement start timing K. This routine shows how the programs stored in the ROM 37 shown in FIG. 2 are executed under the control of the CPU 36.

That is, in the input part 39 shown in FIG. 2, when a given operation for tool switching is executed, in Step S1 (the term "Step" is hereinafter omitted) shown in FIG. 7, radiuses D1 to D4 are calculated and data on theses radiuses D1 to D4 are stored in the working area of the RAM 38. And, according to the above-mentioned comparison between D1 and D2 or between D3 and D4, there are decided the radiuses of the reference arcs E1 in the respective corner portions. Each of these reference arcs E1 is set such that it is inscribed in a first axis and a second axis which are the moving route of the tool post 26. When the setting of the reference arc E1 is ended, in order that the approximate arc locus E2 of the tool post 26 can be set outside the reference arc E1 according to the reference arc E1, there is carried out a processing for setting the overlap movement start timing K of the tool post 26.

That is, in S2, in the respective corner portions C1 and C2, the X axis or Y axis on which the tool post 26 moves earlier is regarded as a first axis, and the X axis or Y axis on which the tool post 26 moves later is regarded as a second axis; and, the operation start timing of the tool post 26 in the second axis direction is set for a determined value. For example, in FIG. 3, in the first corner portion C1 which exists on the right, the X axis functions as the first axis and the Y axis functions as the second axis. In the second corner portion C2 existing on the left, the Y axis functions as the first axis, while the X axis functions as the second axis. The operation start timing on the second axis is set in the ROM 37 such that, for example, the operation start timing on the second axis coincides with the operation start timing on the first axis or the operation start timing on the second axis is delayed slightly with respect to the operation start timing on the first axis. In short, in this stage, the operation start timing on the second axis may not be earlier than the operation start timing on the first axis. By the way, in FIG. 4, since the X axis functions as the first axis and the Y axis functions as the second axis; and, therefore, FIG. 4 shows the example of the corner portion C1 shown right in FIG. 3.

Figure 9A:
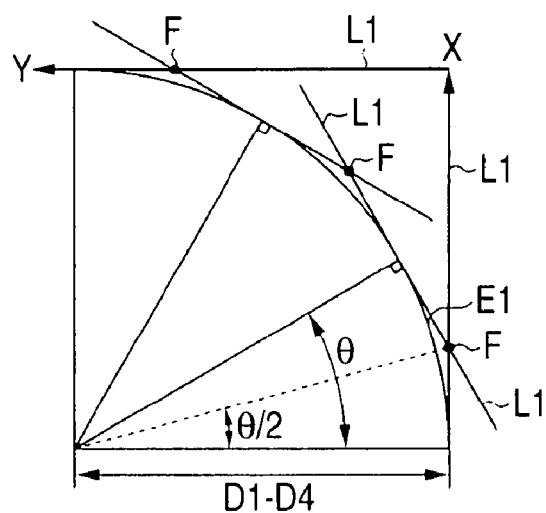
FIGS. 9A to 9D are diagrams showing a relationship between a reference arc and an approximate arc locus corresponding to a setting of an overlap movement start timing.

In S3, as shown in FIG. 9A, not only there are calculated more than one tangent L1 for every given regular interval angle θ with respect to the reference arc E1, but also there are calculated intersection coordinates F functioning as intersections with these tangents L1. In this manner, since the tangents L1 are spaced at regular angle intervals, the respective distances between the respective intersection coordinates F and reference arc E1 can be made equal to each other. In FIG. 9A, the number of the tangents L1 is four including the X axis functioning as the first axis and the Y axis functioning as the second axis and, therefore, their associated intersection coordinates F are set in three positions spaced at regular intervals. The above-mentioned given angle θ is an angle which has been previously set by manual input or the like and, therefore, the number of the tangents L1 and the number of intersection coordinates F are to be set previously.

Figure 9B:
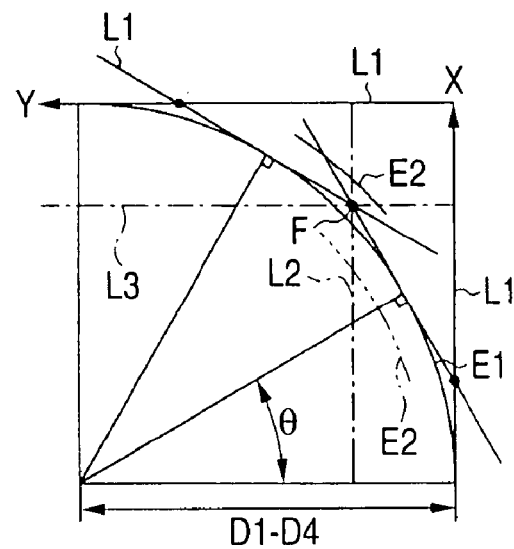
Figure 9C:
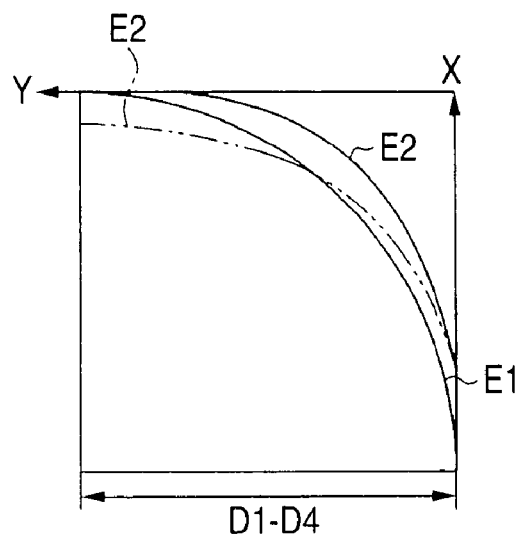
Figure 10A:
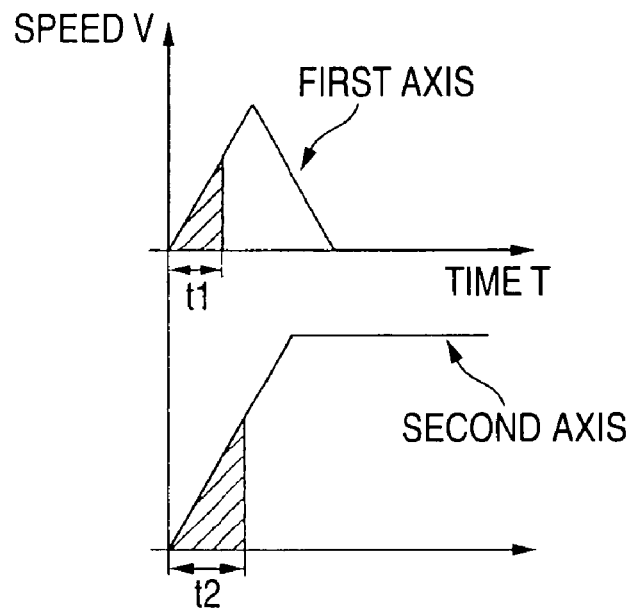
FIGS. 10A and 10B are diagrams showing a relationship between a first time and a second time corresponding to a setting of an overlap movement start timing.

In S4, assuming that the tool post 26 has moved while drawing an approximate locus E2 to be created by the above-mentioned overlap movement start timing K, as shown in FIGS. 9B and 10A, there are calculated a first time t1 and a second time t2 where the tool post 26 arrives at a Y axis direction line L3 functioning as a second axis direction line and at an X axis direction line L2 functioning as a first axis direction line, both the Y and X axis direction lines L3 and L2 passing through the intersection coordinates F.

Next, in S5, the time t1 and time t2 are compared with each other. When t1=t2, the approximate arc locus E2 is to pass on the intersection coordinates F. When t1<t2, as shown by a solid line in FIG. 9B, the approximate arc locus E2 exists outside the reference arc E1 and is spaced with respect to the intersection coordinates F outwardly from the reference arc E1. For t1>t2, as shown by a two-dot chained line in FIG. 9B, the approximate arc locus E2 is situated nearer to the reference arc E1 than the intersection coordinates F. Therefore, when t1≦t2 is satisfied, the approximate arc locus E2 does not come inside the reference arc E1, whereas, for t1>t2, as shown by a two-dot chained line in FIG. 9C, there is a possibility that the tool post 26 can move inside the reference arc E1, thereby raising a fear that the tools 27A to 27C can interfere with the work W. In other words, since the intersection coordinates F and reference arc E1 are close to each other, for t1>t2, there is a high possibility that the approximate arc locus E2 has come inside the reference arc E1 in the vicinity of the intersection coordinates F (the first axis direction extended position of the intersection coordinates F). Further, even when the approximate arc locus E2 exists outside the reference arc E1 in the vicinity of the intersection coordinates F, there is a fear that the approximate arc locus E2 has come inside the reference arc E1 between the present intersection coordinates F and next intersection coordinates F. The reason for this is as follows. That is, when the moving locus between the two intersections is near to a linear line, if the moving locus comes inside the intersection coordinates F on one intersection coordinate F, there is a high possibility that the approximate arc locus E2 between the two intersection coordinates F respectively existing before and behind such intersection coordinate F has come inside the reference arc E1. By the way, as in the operation according to the present embodiment, the moving locus, normally, provides a linear-shaped locus or an outward expanded arc-shaped locus, but does not provide an inward expanded locus under the condition that a first axis moves earlier than or simultaneously with a second axis, the two axes then move overlappingly and, after then, the first axis stops earlier than or simultaneously with the second axis. Therefore, when the moving locus exists outside on all intersection coordinates F, there is no possibility that the moving locus can come inside the reference arc E1.

Figure 10B:
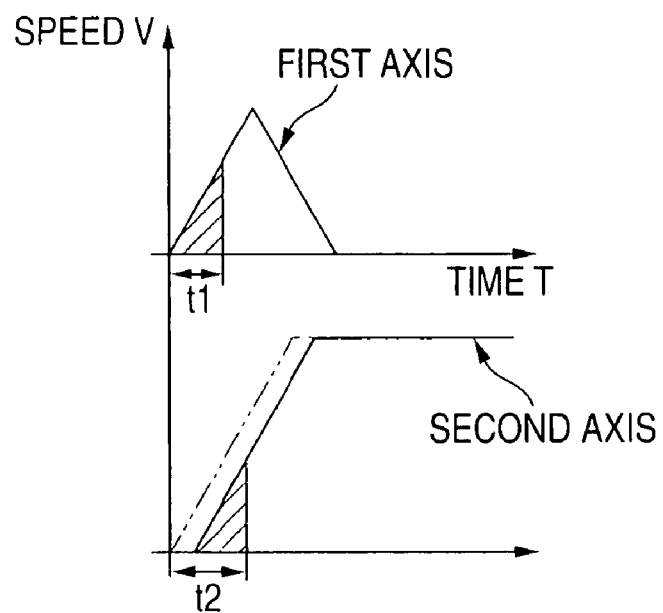

Therefore, for t1>t2, in S6, as shown in FIG. 10B, in order to provide t1=t2, the movement start timing in the second axis direction is delayed.

And, data on an overlap movement start timing K expressing t1=t2 or t1<t2 are stored in the temporary retention area of the RAM 38.

When t1=t2 or t1<t2 is satisfied, the program goes to S7. In S7, it is checked on all intersection coordinates F whether the processings in S3 to S6 have been ended or not. When ended, the program goes to S8; and, when not ended, the program goes back to S3.

Figure 3:
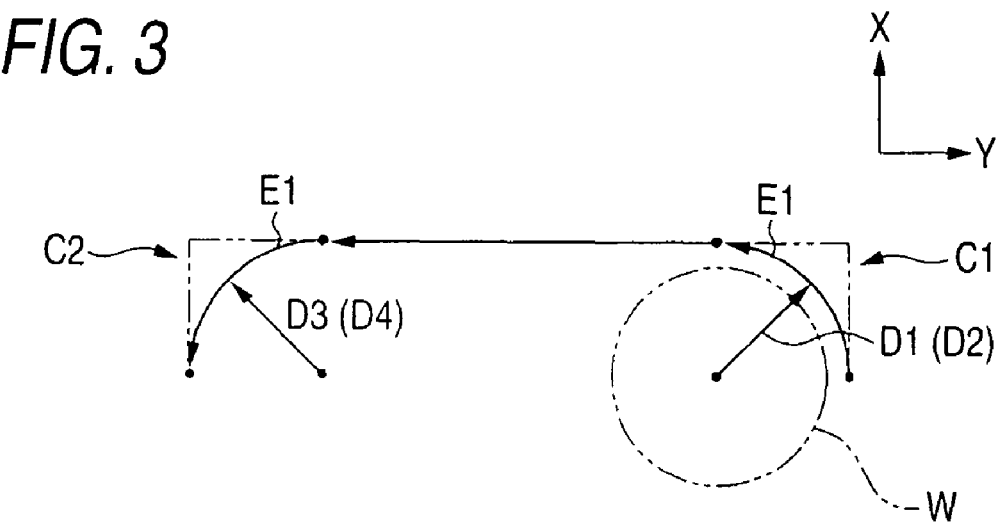
FIG. 3 is a diagram showing a route of a tool post.

In S8, it is checked on all corner portions C1, C2 of a path, for example, shown in FIG. 3 whether the processings in S2 to S7 have been ended or not. When ended, that is, when the setting of the overlap movement start timing K in all corner portions has been ended, the program goes to S9. When not ended, the program goes back to S2, where the processing changes to the processing of the overlap movement start timing K on the next corner portion.

In this manner, the routes along which the tools 27A to 27C move outside the reference arc E1, in other words, the overlap movement start timings K expressing the approximate arc locus E2 that does not interfere with the work W are calculated; and, in S9, the data on the overlap movement start timing K is transferred from the temporary retention area of the RAM 38 and is stored into the working area of the RAM 38.

Therefore, after then, when switching the tools, not only the tool post 26 can be moved outside the reference arc E1 by rapid traverse while drawing the approximate arc locus E2 but also interference between the tools 27A to 27C and the outer peripheral surface of the work W can be prevented. Thanks to this, the switching of the tools 27A to 27C can be carried out in a short time and the working efficiency of the machine tool can be enhanced.

Figure 9D:
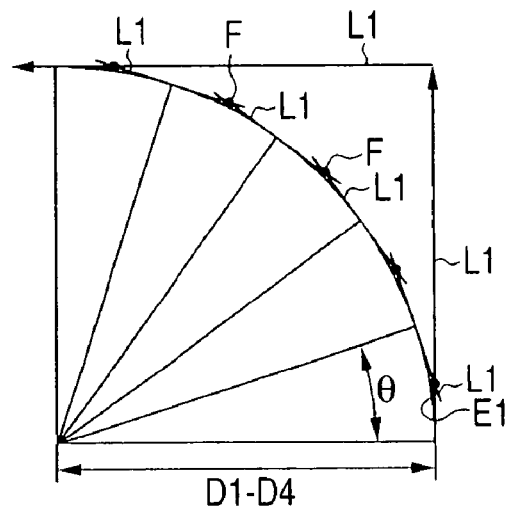

As shown in FIG. 9D, the more the number of the tangents L1 to be set at regular angle intervals is, the nearer to the reference arc E1 the intersection coordinates F come; and, therefore, the approximate arc locus E2 can be made to approach the reference arc E1 further. In FIGS. 9A and 9B, there is shown an example in which, for simplification of explanation, the value of the regular spacing angle θ is set for 30 degrees. However, actually, the angle is set in the range of about 1 to 18 degrees; and, therefore, the intersection coordinates F exist at positions which are quite close to the reference arc E1. Accordingly, in this case, it is possible to shorten the route of the approximate arc locus E2, thereby being able to further shorten the tool switching time.

According to the present embodiment, there can be obtained the following effects.

Figure 19:
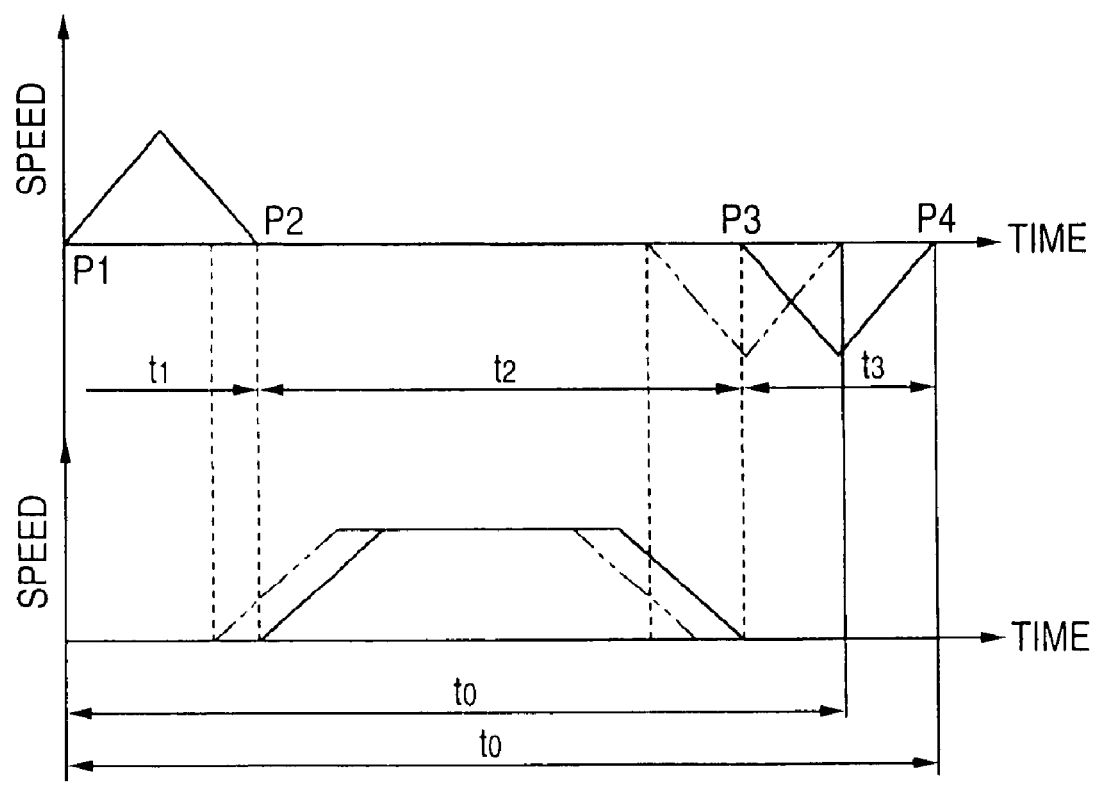
FIG. 19 is a graph showing velocity changes of the tools of FIG. 18.

(1) In the tool switching operation, owing to the overlap movement by rapid traverse in the X axis direction and in the Y axis direction, the tool post 26 is moved while drawing the approximate arc locus E2 based on the reference arc E1. Thanks to this, when compared with the conventional tool switching method shown in FIGS. 17A to 19, as can be obviously seen from a two-dot chained line shown in FIG. 19, the time $t_0$ necessary for the tool switching operation can be shortened. This makes it possible to enhance the productivity of the machine tool.

(2) When moving the tools 27A to 27C to their respective retreat positions, as the reference arc E1, there is set an arc having a radius equal to or less than the distance D1 between the nose of the tool 27A used before the tool switching operation and the outer peripheral surface of the tool 27B which adjoins the tool 27A and exists backwardly of the tool 27A in the moving direction. Also, when moving the tools 27A to 27C to their respective approach positions with respect to the work W, as the reference arc E1, there is set an arc having a radius equal to or less than the distance D3 between the nose of the tool 27C to be used after the tool switching operation and the outer peripheral surface of the tool 27B which adjoins the tool 27C and exists forwardly of the tool 27C in the moving direction. As described above, the reference arc E1 is set such that it has a radius equal to or less than the distance D1 or D3 between the nose of the tool 27A or 27C and the outer peripheral surface of the tool 27B adjoining the tools 27A and 27C. Owing to this, the tools 27A to 27C are allowed move outside the reference arc E1 spaced a given distance apart from the work W, whereby, when the tools 27A to 27C are selectively moved, they are prevented from interfering with the work W. This can be attained not only by paying attention to the fact that the noses of the parallel arranged tools 27A to 27C and the outer peripheral surfaces of the tools 27A to 27C respectively adjoining the tool noses are disposed spaced from each other by such distance as to prevent them from touching the work W at the same time, but also by using this position relationship when setting the reference arc E1. That is, since the distances D1, D3 and distances D2, D4 are compared with each other and the shorter one of the distances is set as the radius of the reference arc E1, in other words, since the radius of the reference arc E1 is up to the distance D1 or D3, under the condition that the noses of the tools 27A to 27C and the outer peripheral surfaces of the tools 27A to 27C respectively adjoining their associated tool noses are prevented from touching the work W at the same time, the interference between the tools and work W can be avoided properly.

(3) Since the overlap movement start timing K of the tool post 26 may simply be set, the load of the memory or the RAM 38 can be reduced.

(4) The tool post 26, in the corner portions C1 and C2, is moved while drawing the approximate arc locus E2 within an area defined by the X and Y axes and does not go beyond such area. Owing to this, the moving routes of the tool post 26 and tools 27A to 27C can be shortened and thus the moving time thereof can be shortened. The shortened time makes it possible to enhance the productivity of the machine tool.

(5) By setting the overlap movement start timing K of the tool post 26, it can be found whether the approximate arc locus E2 of the tool post 26 passes inside the intersection coordinate F situated outside the reference arc E1 or not. When the approximate arc locus E2 exists inside the intersection coordinate F, the overlap movement start timing K is delayed so that the approximate arc locus E2 is allowed to exist outside the intersection. Therefore, regardless of the rapid traverse speed or the speeds of acceleration and deceleration, the overlap movement start timing K can be set properly. Thanks to this, the invention can flexibly applied even to a machine tool which is different in the rapid traverse speed and in the speeds of acceleration and deceleration.

Second Embodiment

Next, description will be given below of a second embodiment according to the invention with reference to FIGS. 1 to 8, FIGS. 11 to 13, mainly of the portions thereof which are different from the above-mentioned first embodiment.

Figure 8:
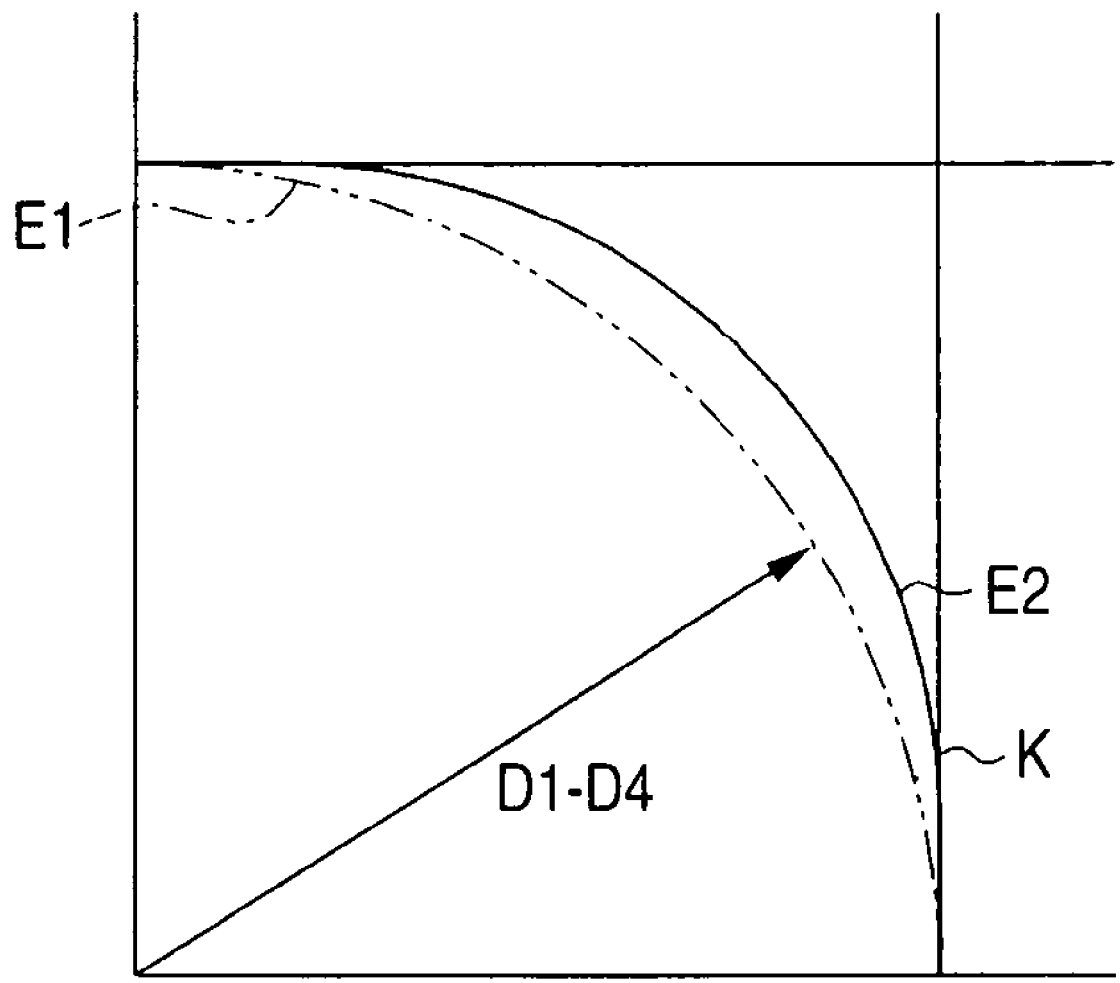
FIG. 8 is a diagram showing a relationship between a reference arc and an approximate arc locus.
Figure 11:
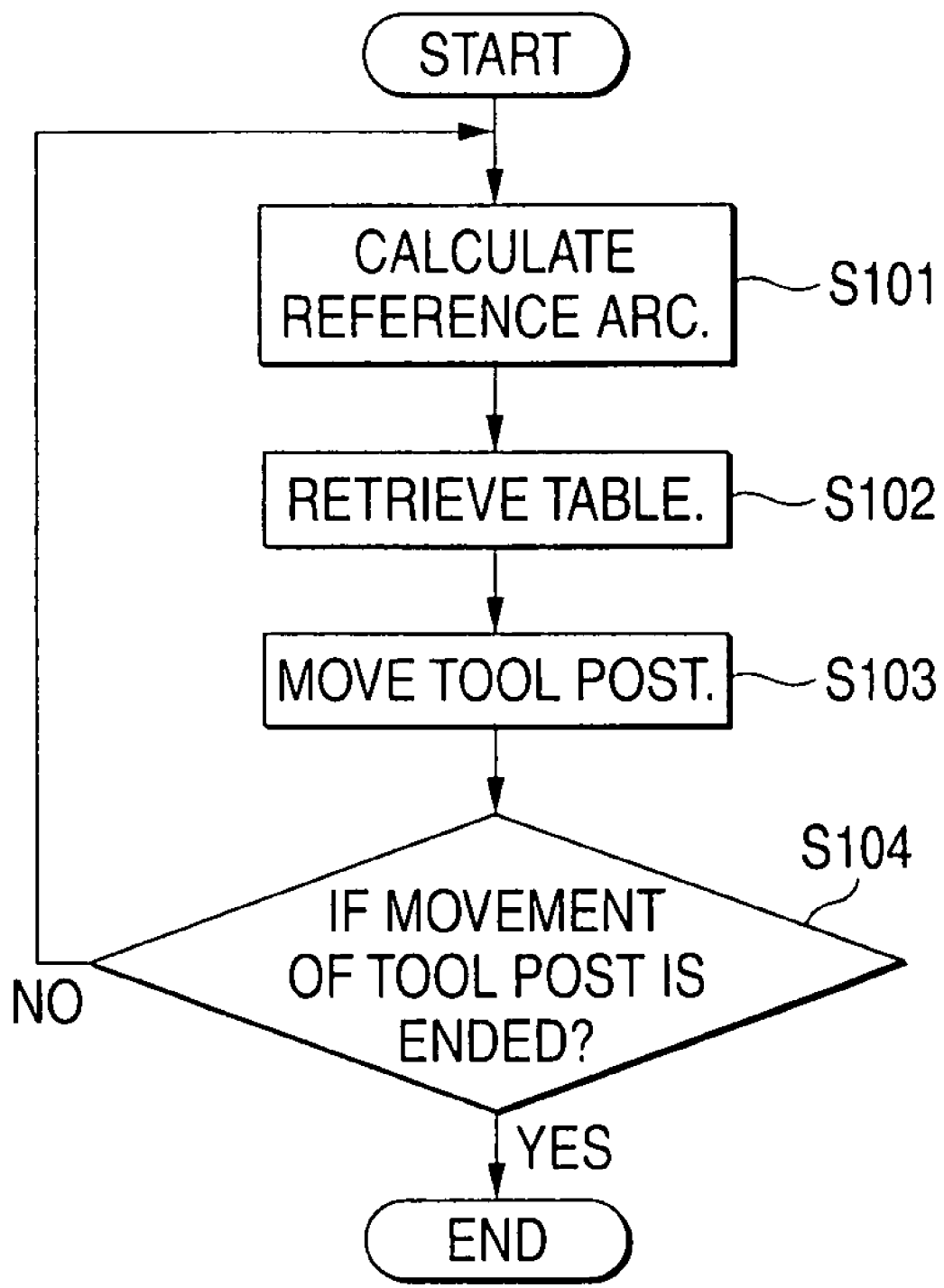
FIG. 11 is a flowchart showing a program for setting an overlap movement start timing according to a second embodiment of the invention.

In the second embodiment, as shown in FIGS. 4 and 8, overlap movement start timing K used to form an approximate arc locus E2, which does not interfere with the work W, is not set by calculation but is set based on a program shown in FIG. 11 according to tables respectively shown in FIGS. 12 and 13. These tables are data tables on overlap movement start timings K previously calculated from the relationship between the travel distances of the tool post 26 in the first axis direction and the radiuses of the reference arc E1, and these tables are stored in the given area of the RAM 38 in such a manner that they correspond to the corner portions C1 and C2 respectively. FIG. 12 is a table used to set the overlap movement start timings K in the first corner portion C1 shown in FIGS. 3, 5A and 5B, whereas FIG. 13 is a table used to set the overlap movement start timings K in the second corner portion C2 shown in FIGS. 3, 5C and 5D.

In the tool selective operation, the CPU 36, firstly, in S101 shown in FIG. 11, calculates the reference arc E1 similarly to the first embodiment. Next, in S102, from the data table of the RAM 38 shown in FIG. 12, there is extracted the overlap movement start timing K according to the relationship between the travel distance of the tool post 26 in the first axis direction in the first corner portion C1, that is, the travel distance of the tool post 26 in the X axis direction and the radius of the reference arc E1; and, the thus extracted overlap movement start timing K is then stored into the working area of the RAM 38. For example, when the travel distance of the tool post 26 in the X axis direction is 10 mm and the radius of the reference arc E1 is 6 mm, from the data table shown in FIG. 12, there is found the position of the overlap movement start timing K, namely, 4.1 mm. And, in S103, the overlap movement in the Y axis direction is started from a point where the travel distance of the tool post 26 in the X axis direction is 4.1 mm, and the tool post 26 is moved outside the reference arc E1 in the first corner portion C1 while drawing the approximate arc locus E2 without interfering with the work W.

Also, in the second corner portion C2, after calculation of the reference arc E1 in S101, in S102, from the data table of the RAM 38 shown in FIG. 13, there is extracted the overlap movement start timing K according to the relationship between the travel distance of the tool post 26 in the direction of the Y axis functioning as the first axis and the radius of the reference arc E1; and, the thus extracted overlap movement start timing K is then stored into the working area of the RAM 38. For example, when the travel distance of the tool post 26 in the Y axis direction is 40 mm and the radius of the reference arc E1 is 6 mm, from the data table shown in FIG. 13, there is found the position of the overlap movement start timing K, namely, 34.1 mm. And, in S103, the overlap movement of the tool post 26 in the X axis direction in the second corner portion C2 is started at a point where the travel distance of the tool post 26 in the Y axis direction is 34.1 mm, and the tool post 26 is moved outside the reference arc E1 while drawing the approximate arc locus E2.

Therefore, according to the second embodiment of the invention, there can be obtained the following effect.

(6) Since, in setting the overlap movement start timing K, there is extracted from the table the data on the present overlap movement start timing K, the setting of the overlap movement start timing K can be carried out quickly in a short time.

Third Embodiment

Next, description will be given below of a third embodiment of the invention with reference to FIGS. 14A to 16, mainly of the portions thereof which are different from the second embodiment.

Figure 14A:
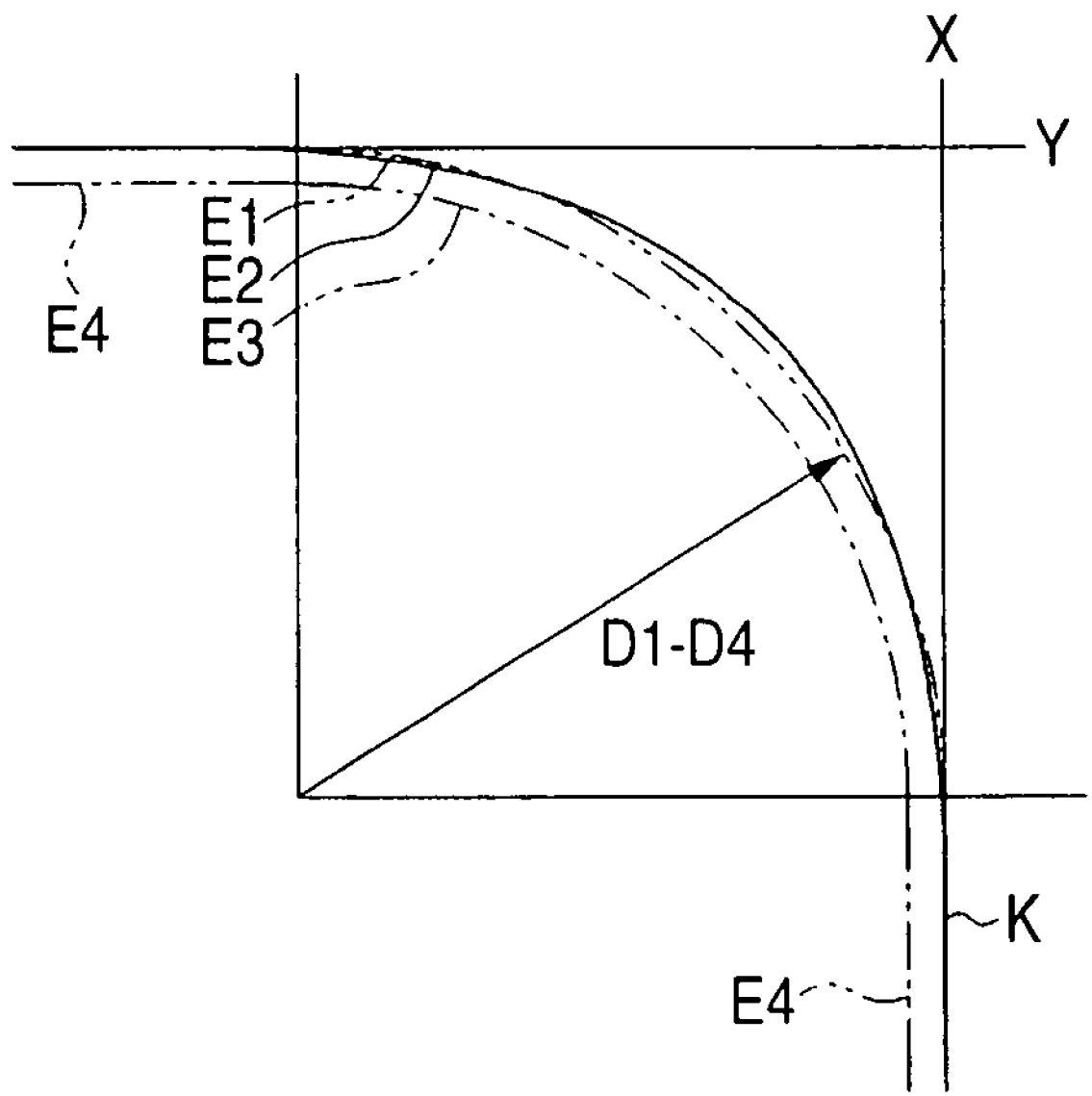
FIG. 14A is a diagram showing a relationship of a reference arc, an approximate arc locus and a permissible arc according to a third embodiment of the invention.

In the third embodiment, as shown in FIG. 14A, between the reference arc E1 and the outer peripheral surface of the work W, in an area not in contact with the work W, there are virtually set a permissible arc E3 and a permissible line E4 composed of a straight line, and there are formed tables expressing data on the travel distances of the tool post 26 and the radiuses of the reference arc E1. The permissible line E4 is formed to be continuous with the end portion of the permissible arc E3. That is, the third embodiment permits at least the two end portions of the approximate arc locus E2 of the tool post 26 to be situated between (the permissible arc E3 and permissible line E4) and (reference arc E1). The permissible arc E3 and permissible line E4 are set with a clearance C shown in FIGS. 5A to 5D taken into consideration. For example, they are set inside the first axis, second axis and reference arc E1 at a position spaced from the reference arc E1 by an amount equivalent to 20% or so of the clearance C. And, data on the permissible arc E3 and permissible line E4 may be previously set in the ROM 37 or may be manually input into the ROM 37 from the input part 39 by a user.

Accordingly, as can be seen clearly from FIGS. 15 and 16, the data shown in the respective tables can be used to quicken the overlap movement start timing K.

For example, similarly to the above, in the first corner portion C1, when the travel distance of the tool post 26 in the X direction is 10 mm and the radius of the reference arc E1 is 6 mm, from the data table shown in FIG. 15, as the overlap movement start timing K, there can be found 3.8 mm. And, in S103, the Y axis overlap movement of the tool post 26 is started at a point where the travel distance of the tool post 26 in the X axis direction is 3.8 mm, and the tool post 26 is moved outside the reference arc E1 while drawing the approximate arc locus E2.

Also, in the second corner portion C2, when the travel distance of the tool post 26 in the Y axis direction is 40 mm and the radius of the reference arc E1 is 6 mm, from the data table shown in FIG. 16, as the overlap movement start timing K, there can be found 29.6 mm. And, in S103, the X axis overlap movement of the tool post 26 is started at a point where the travel distance of the tool post 26 in the Y axis direction is 29.6 mm.

Figure 14B:
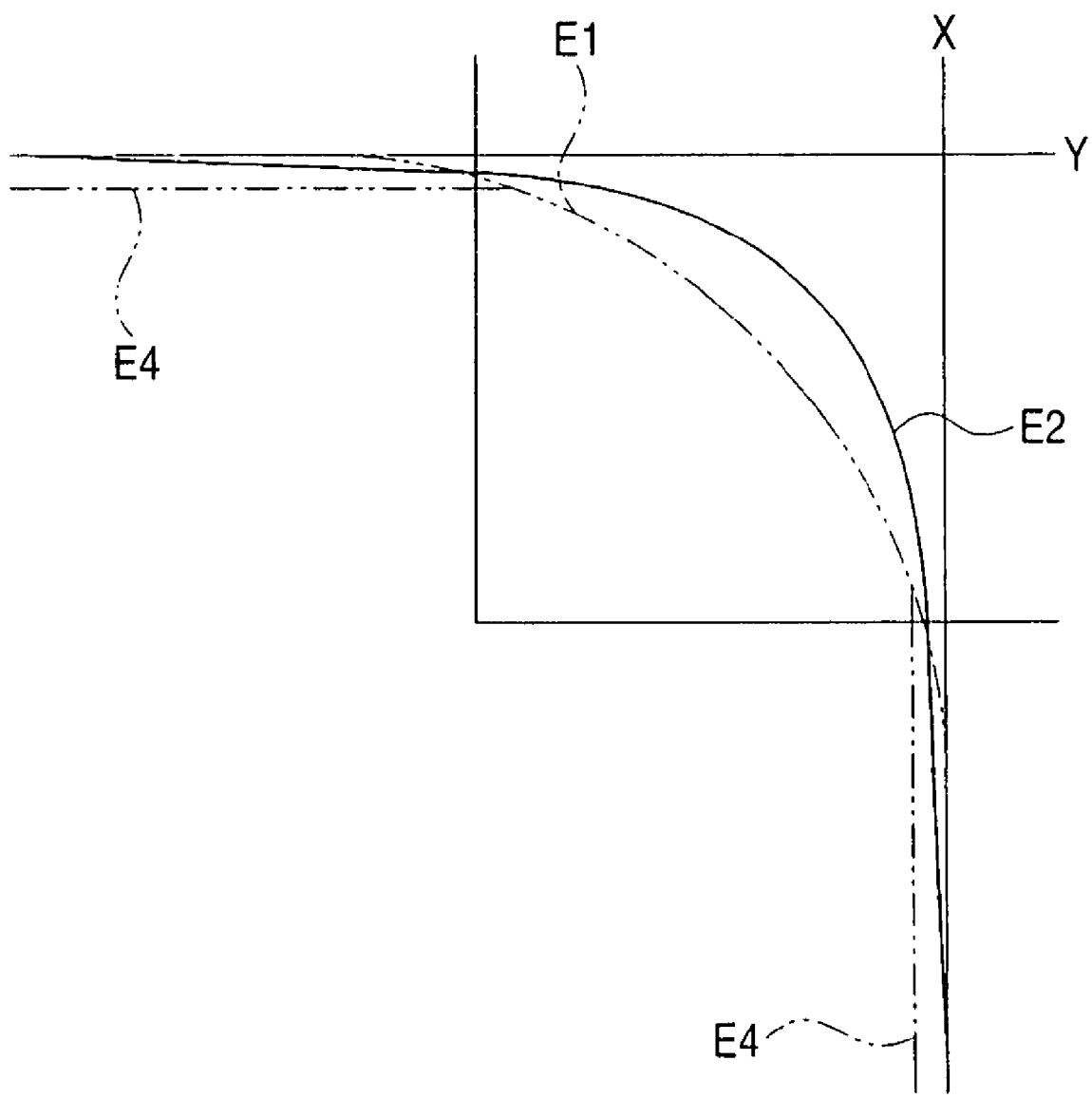
FIG. 14B is a diagram showing a relationship of a reference arc, an approximate arc locus, a permissible arc and a permissible line according to the third embodiment of the invention.
Figure 17A:
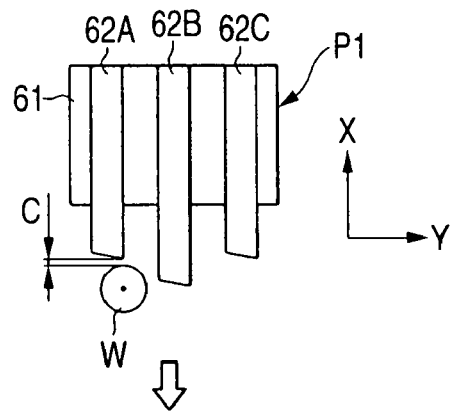
FIGS. 17A to 17D are partial diagrammatic elevation views showing selection operation of tools of a machine tool according to a related art.
Figure 17B:
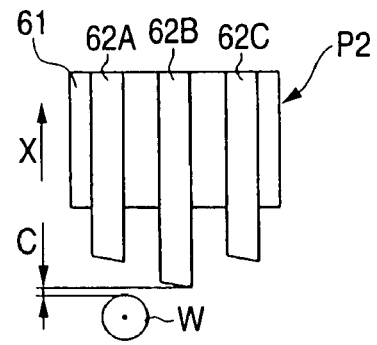
Figure 17C:
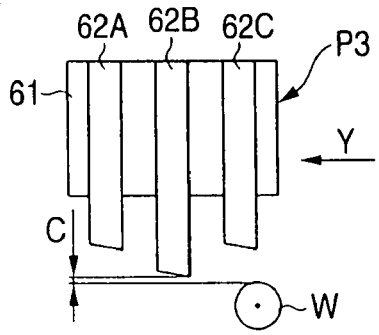
Figure 17D:
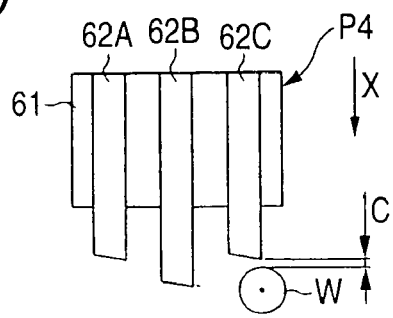
Figure 18:
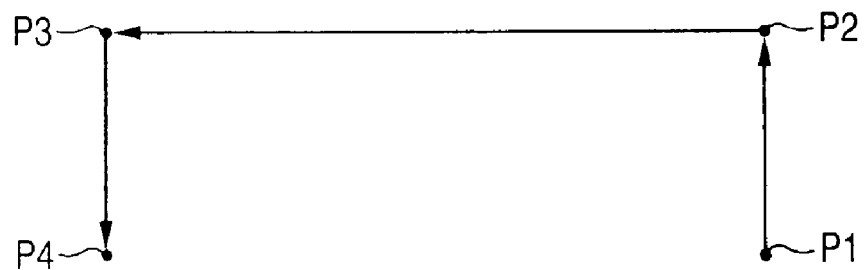
FIG. 18 shows a route of the tools of FIG. 17.

Also, in the present embodiment, alternatively, the permissible arc E3 may not be set but only the permissible line E4 may be employed. In this case, as shown in FIG. 14B, the permissible line E4 is extended up to the position of the reference arc E1. Therefore, an area, where the tool post 26 does not come into contact with the work W, is set based on the reference arc E1 and permissible line E4 and thus a table is formed according to data on the reference arc E1 and permissible line E4.

Thus, according to the third embodiment, there can be obtained the following effect.

(7) Since the tool post 26 can be moved inside the reference arc E1, the moving route of the tool post 26 can be shortened, thereby being able to reduce the time necessary for the tool switching operation.

Modifications

By the way, the above-mentioned embodiments can also be enforced while they are modified in the following manner.

In the above embodiments, the invention is embodied in the control of the movement of the tool post 26 in the tool switching operation of a machine tool. However, the invention can also be embodied in other apparatus, for example, a carrier apparatus such as a carrier robot which holds a work or the like and carries it from one position to the other position.

In the above embodiments, the overlap movement start timing K is set based on the data on the positions of the tool post 26 on the X and Y axes. However, the overlap movement start timing K can also be set based on data on the time that has passed after start of the movement of the tool post 26.

In the above embodiments, the first and second axes are arranged to intersect each other at right angles. However, the invention can also be embodied in a structure in which the two axes intersect each other obliquely.

And, in the above embodiments, the invention is embodied by switching the tools 27 which are composed of cutting tools. However, the invention can also be embodied by switching other tools such as rotary tools.

What is claimed is:

1. A movement control apparatus for a moving member, comprising:
a drive unit that moves the moving member by rapid traverse on a first axis and a second axis intersecting the first axis, and overlaps the rapid traverse movements in the two axis directions to thereby allow the moving member to move around the periphery of a given area;

a reference arc setting unit that sets a reference arc inscribed in the first and second axes;

a timing setting unit that sets an overlap movement start timing for the rapid traverse of the moving member based on the reference arc when switching the moving member from the first axis to the second axis;

a control unit that controls the operation of the drive unit to move the moving member at a timing set by the timing setting unit;

a first calculating unit that calculates more than one tangent to the reference arc and the intersections of the respective tangents; and a second calculating unit that calculates a first time and a second time respectively necessary for the moving member to arrive at a first axis direction parallel line to the first axis and at a second axis direction parallel line to the second axis respectively passing through the intersections from the start of a movement of the moving member, wherein the timing setting unit delays the overlap movement start timing of the moving member in order for the two times to be at least equal to each other when the second time is shorter than the first time.

2. The movement control apparatus according to claim 1, wherein the more than one tangent are set at regular angle intervals.

3. A movement control apparatus for a moving member, comprising:

a drive unit that moves the moving member by rapid traverse on a first axis and a second axis intersecting the first axis, and overlaps the rapid traverse movements in the two axis directions to thereby allow the moving member to move around the periphery of a given area;

a reference arc setting unit that sets a reference arc inscribed in the first and second axes;

a timing setting unit that sets an overlap movement start timing for the rapid traverse of the moving member based on the reference arc when switching the moving member from the first axis to the second axis; and a control unit that controls the operation of the drive unit to move the moving member at a timing set by the timing setting unit, wherein the timing setting unit includes a table which contains data on overlap movement start timings set based on the relationship between the travel distance of the moving member in the first axis direction and the radius of the reference arc; and wherein the control unit controls the operation of the drive unit according to the data shown in the table.

4. The movement control apparatus according to claim 3, wherein the table contains data on overlap movement start timings set based on a permissible line and a permissible arc which are continuous with each other and are respectively set by a given amount inwardly of the first axis, second axis and reference arc.

5. A movement control apparatus for a machine tool that includes a tool post with more than one tool parallel arranged thereon, the movement control apparatus comprising:

a drive unit that generates relative movements by rapid traverse between the tool post and a work in the direction of a first axis and in the direction of a second axis intersecting the first axis, and overlaps the rapid traverse relative movements in the two axes directions to thereby move the tool post relatively to the work in the periphery of the work;

a reference arc setting unit that sets a reference arc inscribed in the first and second axes;

a timing setting unit that sets an overlap movement start timing for the rapid traverse of the tool post based on the reference arc when switching the tool post from the first axis to the second axis;

a control unit that controls the operation of the drive unit to move the tool post at a timing set by the timing setting unit, wherein the switching of the tools is carried out by the control unit; and a distance setting unit that sets a spaced distance in the tool parallel arrangement direction between the nose of a tool and the outer peripheral surface of another tool adjoining the tool nose, wherein the reference arc setting unit sets the radius of the reference arc at the value of a distance equal to or less than the spaced distance.

6. A movement control apparatus for a machine tool that includes a tool post with more than one tool parallel arranged thereon, the movement control apparatus comprising:

a drive unit that generates relative movements by rapid traverse between the tool post and a work in the direction of a first axis and in the direction of a second axis intersecting the first axis, and overlaps the rapid traverse relative movements in the two axes directions to thereby move the tool post relatively to the work in the periphery of the work;

a reference arc setting unit that sets a reference arc inscribed in the first and second axes;

a timing setting unit that sets an overlap movement start timing for the rapid traverse of the tool post based on the reference arc when switching the tool post from the first axis to the second axis;

a control unit that controls the operation of the drive unit to move the tool post at a timing set by the timing setting unit, wherein the switching of the tools is carried out by the control unit; and a distance setting unit that sets a spaced distance in the tool parallel arrangement direction between the nose of a tool and the outer peripheral surface of another tool adjoining the tool nose, and sets the travel distance of the tool in the tool advancing and retreating direction, wherein the reference arc setting unit compares the spaced distance and travel distance, and the reference arc setting unit sets the radius of the reference arc at the value of the shorter one of the two compared distances.

7. A movement control apparatus for a machine tool that includes a tool post with more than one tool parallel arranged thereon, the movement control apparatus comprising:

a drive unit that generates relative movements by rapid traverse between the tool post and a work in the direction of a first axis and in the direction of a second axis intersecting the first axis, and overlaps the rapid traverse relative movements in the two axes directions to thereby move the tool post relatively to the work in the periphery of the work;

a reference arc setting unit that sets a reference arc inscribed in the first and second axes;

a timing setting unit that sets an overlap movement start timing for the rapid traverse of the tool post based on the reference arc when switching the tool post from the first axis to the second axis;

a control unit that controls the operation of the drive unit to move the tool post at a timing set by the timing setting unit, wherein the switching of the tools is carried out by the control unit; and a distance setting unit that sets a spaced distance in the tool parallel arranged direction between a work and the nose of a tool adjoining the work, wherein the reference setting unit sets the radius of the reference arc at the value of a distance equal to or less than the spaced distance.

8. A movement control apparatus for a machine tool that includes a tool post with more than one tool parallel arranged thereon, the movement control apparatus comprising:

a drive unit that generates relative movements by rapid traverse between the tool post and a work in the direction of a first axis and in the direction of a second axis intersecting the first axis, and overlaps the rapid traverse relative movements in the two axes directions to thereby move the tool post relatively to the work in the periphery of the work;

a reference arc setting unit that sets a reference arc inscribed in the first and second axes;

a timing setting unit that sets an overlap movement start timing for the rapid traverse of the tool post based on the reference arc when switching the tool post from the first axis to the second axis;

a control unit that controls the operation of the drive unit to move the tool post at a timing set by the timing setting unit, wherein the switching of the tools is carried out by the control unit; and a distance setting unit that sets a spaced distance in the tool parallel arranged direction between a work and the nose of a tool adjoining the work, and sets the travel distance of the tool in the tool advancing and retreating direction in the tool switching operation, wherein the reference setting unit compares the spaced distance and travel distance, and the reference setting unit sets the radius of the reference arc at the value of the shorter one of the two compared distances.

* * * * *